US012356421B2

(12) United States Patent
Yoshimura et al.

(10) Patent No.: US 12,356,421 B2
(45) Date of Patent: Jul. 8, 2025

(54) TERMINAL APPARATUS, BASE STATION APPARATUS, AND COMMUNICATION METHOD

(71) Applicant: SHARP KABUSHIKI KAISHA, Sakai (JP)

(72) Inventors: Tomoki Yoshimura, Sakai (JP); Shoichi Suzuki, Sakai (JP); Toshizo Nogami, Sakai (JP); Huifa Lin, Sakai (JP); Wataru Ouchi, Sakai (JP); Daiichiro Nakashima, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 271 days.

(21) Appl. No.: 17/764,740

(22) PCT Filed: Oct. 2, 2020

(86) PCT No.: PCT/JP2020/037508
§ 371 (c)(1),
(2) Date: Mar. 29, 2022

(87) PCT Pub. No.: WO2021/066131
PCT Pub. Date: Apr. 8, 2021

(65) Prior Publication Data
US 2022/0386351 A1 Dec. 1, 2022

(30) Foreign Application Priority Data
Oct. 3, 2019 (JP) ................................ 2019-182822

(51) Int. Cl.
*H04W 72/23* (2023.01)
*H04L 5/00* (2006.01)
*H04L 27/26* (2006.01)

(52) U.S. Cl.
CPC .................................. *H04W 72/23* (2023.01)

(58) Field of Classification Search
CPC .... H04W 72/23; H04L 5/0078; H04L 5/0044; H04L 5/0053; H04L 27/26; H04L 5/0048; H04L 27/2626; H04L 27/2649
(Continued)

(56) References Cited

U.S. PATENT DOCUMENTS

2007/0248175 A1* 10/2007 Bruninghaus ....... H04L 27/2613
                                                                 375/260
2018/0295609 A1* 10/2018 Shimezawa ........... H04L 5/0048
(Continued)

FOREIGN PATENT DOCUMENTS

CN         109845209 A         6/2019

OTHER PUBLICATIONS

NTT DOCOMO, "New SID Proposal: Study on New Radio Access Technology", RP-160671, 3GPP TSG RAN Meeting #71, Göteborg, Sweden, Mar. 7-10, 2016.
(Continued)

*Primary Examiner* — Xuan Lu
(74) *Attorney, Agent, or Firm* — ScienBiziP, P.C.

(57) ABSTRACT

Provided are a channel generation unit configured to generate a time domain signal of a PUCCH mapped from an X-th OFDM symbol to an (X+L)-th OFDM symbol in a slot, and a transmitter configured to transmit the PUCCH. In a case that the time domain signal of the X-th OFDM symbol is generated based at least on contents of resource elements included in an (X+1)-th OFDM symbol, a set of OFDM symbols to which a DMRS of the PUCCH is mapped is given based at least on an assumption that the number of OFDM symbols of the PUCCH is L.

3 Claims, 16 Drawing Sheets

(58) Field of Classification Search
USPC .......................................................... 370/329
See application file for complete search history.

(56) References Cited

U.S. PATENT DOCUMENTS

2018/0351720 A1* 12/2018 Ouchi ...................... H04B 7/04
2019/0174540 A1   6/2019 Yoshimura et al.
2022/0124760 A1*  4/2022 Yang ..................... H04W 72/21

OTHER PUBLICATIONS

MediaTek Inc., "The starting and ending position in time domain of PUSCH", R1-1707844, 3GPP TSG RAN WG1 Meeting #89 Hangzhou, P.R. China May 15-19, 2017.
Nokia, Nokia Shanghai Bell, "On resource allocation for PDSCH and PUSCH in NR", R1-1720479, 3GPP TSG RAN WG1 Meeting 91 Reno, NV, USA, Nov. 27-Dec. 1, 2017.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

| PUCCH duration (symbols) | PUCCH DMRS symbol indices | Number of UCI symbol indices sets $N_{UCI}^{set}$ | 1st UCI symbol indices set $S_{UCI}^{(1)}$ | 2nd UCI symbol indices set $S_{UCI}^{(2)}$ | 3rd UCI symbol indices set $S_{UCI}^{(3)}$ |
|---|---|---|---|---|---|
| 4 | {1} | 2 | {0,2} | {3} | - |
| 4 | {0,2} | 1 | {1,3} | - | - |
| 5 | {0, 3} | 1 | {1, 2, 4} | - | - |
| 6 | {1, 4} | 1 | {0, 2, 3, 5} | - | - |
| 7 | {1, 4} | 2 | {0, 2, 3, 5} | {6} | - |
| 8 | {1, 5} | 2 | {0, 2, 4, 6} | {3, 7} | - |
| 9 | {1, 6} | 2 | {0, 2, 5, 7} | {3, 4, 8} | - |
| 10 | {2, 7} | 2 | {1, 3, 6, 8} | {0, 4, 5, 9} | - |
| 10 | {1, 3, 6, 8} | 1 | {0,2,4,5,7,9} | - | - |
| 11 | {2, 7} | 3 | {1,3,6,8} | {0,4,5,9} | {10} |
| 11 | {1,3,6,9} | 1 | {0,2,4,5,7,8,10} | - | - |
| 12 | {2, 8} | 3 | {1,3,7,9} | {0,4,6,10} | {5, 11} |
| 12 | {1,4,7,10} | 1 | {0,2,3,5,6,8,9,11} | - | - |
| 13 | {2, 9} | 3 | {1,3,8,10} | {0,4,7,11} | {5,6,12} |
| 13 | {1,4,7,11} | 2 | {0,2,3,5,6,8,10,12} | {9} | - |
| 14 | {3, 10} | 3 | {2,4,9,11} | {1,5,8,12} | {0,6,7,13} |
| 14 | {1,5,8,12} | 2 | {0,2,4,6,7,9,11,13} | {3, 10} | - |

FIG. 16

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2019-182822 filed on Oct. 3, 2019, the contents of which are incorporated herein by reference.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas covered by a base station apparatus are distributed in a cell structure. A single base station apparatus may manage multiple serving cells.

3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7th-10th Mar., 2016.

SUMMARY OF INVENTION

Technical Problem

One aspect of the present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention is a terminal apparatus including: a channel generation unit configured to generate a time domain signal of a PUCCH mapped from an X-th OFDM symbol to an (X+L)-th OFDM symbol in a slot; and a transmitter configured to transmit the PUCCH, wherein in a case that the time domain signal of the X-th OFDM symbol is generated based at least on contents of resource elements included in an (X+1)-th OFDM symbol, a set of OFDM symbols to which a DMRS of the PUCCH is mapped is given based at least on an assumption that the number of OFDM symbols of the PUCCH is L.

(2) A second aspect of the present invention is a terminal apparatus including: a channel generation unit configured to generate a time domain signal of a PUCCH mapped from an X-th OFDM symbol to an (X+L)-th OFDM symbol in a slot; and a transmitter configured to transmit CSI part 1 and CSI part 2 on the PUCCH, wherein in a case that the time domain signal of the X-th OFDM symbol is generated based at least on contents of resource elements included in an (X+1)-th OFDM symbol, a set of UCI symbols used in multiplexing of the CSI part 1 and the CSI part 2 is given based at least on an assumption that the number of OFDM symbols of the PUCCH is L.

(3) A third aspect of the present invention is a base station apparatus including: a receiver configured to receive a PUCCH mapped from an X-th OFDM symbol to an (X+L)-th OFDM symbol in a slot; and a channel demodulation unit configured to demodulate a time domain signal of the PUCCH, wherein in a case that the time domain signal of the X-th OFDM symbol is generated based at least on contents of resource elements included in an (X+1)-th OFDM symbol, a set of OFDM symbols to which a DMRS of the PUCCH is mapped is given based at least on an assumption that the number of OFDM symbols of the PUCCH is L.

(4) A fourth aspect of the present invention is a base station apparatus including: a receiver configured to receive a PUCCH mapped from an X-th OFDM symbol to an (X+L)-th OFDM symbol in a slot; and a demodulation unit configured to acquire CSI part 1 and CSI part 2 from the PUCCH, wherein in a case that the time domain signal of the X-th OFDM symbol is generated based at least on contents of resource elements included in an (X+1)-th OFDM symbol, a set of UCI symbols used in multiplexing of the CSI part 1 and the CSI part 2 is given based at least on an assumption that the number of OFDM symbols of the PUCCH is L.

(5) A fifth aspect of the present invention is a communication method used for a terminal apparatus, the communication method including the steps of: generating a time domain signal of a PUCCH mapped from an X-th OFDM symbol to an (X+L)-th OFDM symbol in a slot; and transmitting the PUCCH, wherein in a case that the time domain signal of the X-th OFDM symbol is generated based at least on contents of resource elements included in an (X+1)-th OFDM symbol, a set of OFDM symbols to which a DMRS of the PUCCH is mapped is given based at least on an assumption that the number of OFDM symbols of the PUCCH is L.

(6) A sixth aspect of the present invention is a communication method used for a terminal apparatus, the communication method including the steps of generating a time domain signal of a PUCCH mapped from an X-th OFDM symbol to an (X+L)-th OFDM symbol in a slot; and transmitting CSI part 1 and CSI part 2 on the PUCCH, wherein in a case that the time domain signal of the X-th OFDM symbol is generated based at least on contents of resource elements included in an (X+1)-th OFDM symbol, a set of UCI symbols used in multiplexing of the CSI part 1 and the CSI part 2 is given based at least on an assumption that the number of OFDM symbols of the PUCCH is L.

(7) A seventh aspect of the present invention is a communication method used for a base station apparatus, the communication method including the steps of:

receiving a PUCCH mapped from an X-th OFDM symbol to an (X+L)-th OFDM symbol in a slot; and demodulating a time domain signal of the PUCCH, wherein in a case that the time domain signal of the X-th OFDM symbol is generated based at least on contents of resource elements included in an (X+1)-th OFDM symbol, a set of OFDM symbols to which a DMRS of the PUCCH is mapped is given based at least on an assumption that the number of OFDM symbols of the PUCCH is L.

(8) An eighth aspect of the present invention is a communication method used for a base station apparatus, the communication method including the steps of: receiving a PUCCH mapped from an X-th OFDM symbol to an (X+L)-th OFDM symbol in a slot; and acquiring CSI part 1 and CSI part 2 from the PUCCH, wherein in a case that the time domain signal of the X-th OFDM symbol is generated based at least on contents of resource elements included in an (X+1)-th OFDM symbol, a set of UCI symbols used in multiplexing of the CSI part 1 and the CSI part 2 is given based at least on an assumption that the number of OFDM symbols of the PUCCH is L.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between a subcarrier spacing configuration μ, the number $N^{slot}_{symb}$ of OFDM symbols per slot, and a cyclic Prefix (CP) configuration according to an aspect of the present embodiment.

FIG. 16 is a diagram illustrating an example related to a determination method of a set of UCI symbols according to an aspect of the present embodiment.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a roof function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol is converted into a time-continuous signal in baseband signal generation. In the downlink, Cyclic Prefix—Orthogonal Frequency Division Multiplex (CP-OFDM) is at least used. In the uplink, one of CP-OFDM or Discrete Fourier Transform-spread-Orthogonal Frequency Division Multiplex (DFT-s-OFDM) is used. DFT-s-OFDM may be given by applying transform precoding to CP-OFDM.

The OFDM symbol may be a term including a CP added to the OFDM symbol. In other words, a certain OFDM symbol may include the certain OFDM symbol, and a CP added to the certain OFDM symbol.

Figure 1:
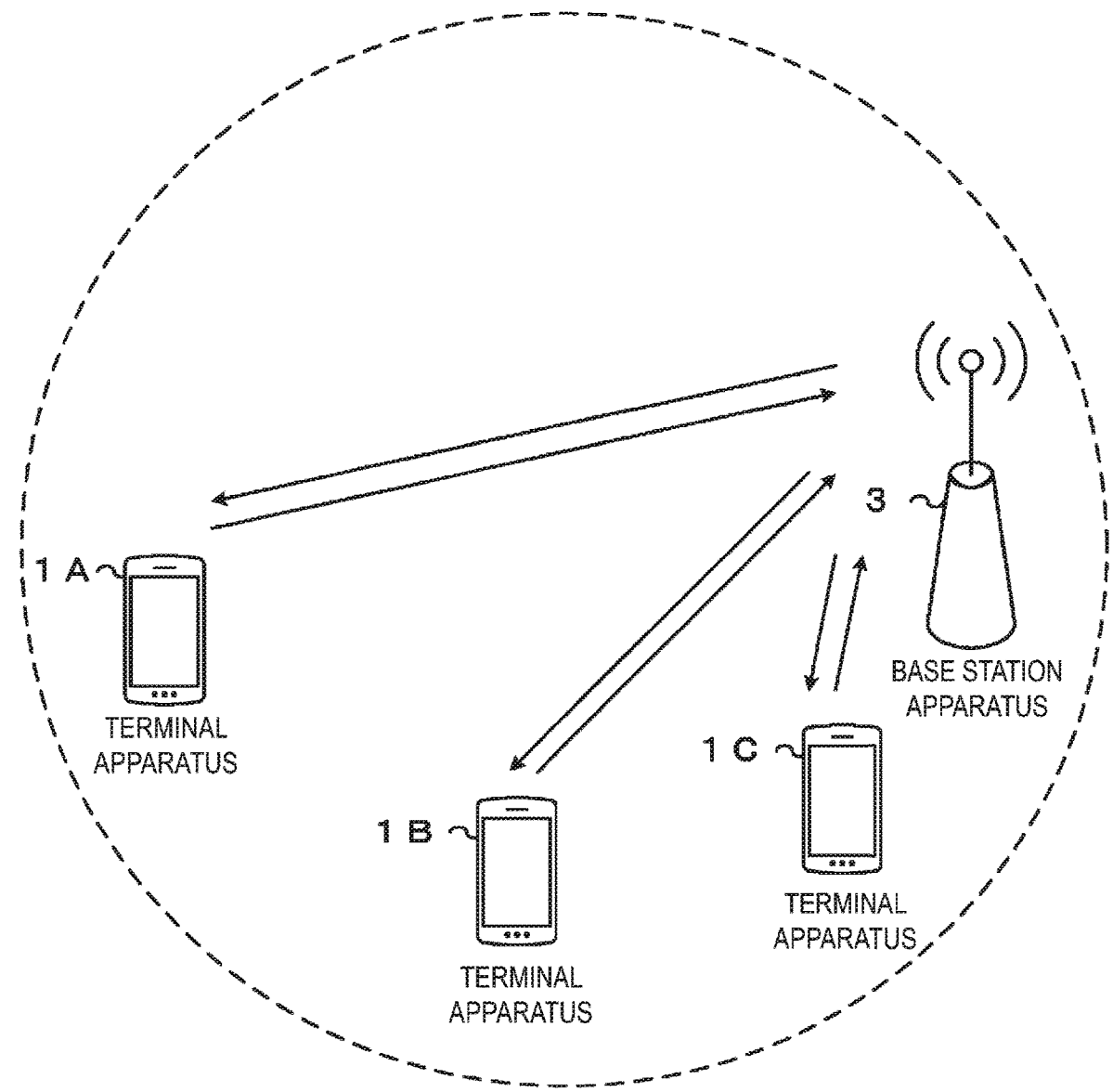
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system at least includes terminal apparatuses 1A to 1C and a base station apparatus 3 (base station #3 (BS #3)). The terminal apparatuses 1A to 1C are hereinafter also referred to as "terminal apparatus 1" (User Equipment #1 (UE #1)).

The base station apparatus 3 may include one or multiple transmission apparatuses (or transmission points, transmission and/or reception apparatuses, transmission and/or reception points). In a case that the base station apparatus 3 includes multiple transmission apparatuses, each of the multiple transmission apparatuses may be deployed at different positions.

The base station apparatus 3 may provide one or multiple serving cells. The serving cell may be defined as a set of resources used for radio communication. The serving cell is also referred to as a cell.

The serving cell may at least include one downlink component carrier (downlink carrier), and/or one uplink component carrier (uplink carrier). The serving cell may at least include two or more downlink component carriers, and/or two or more uplink component carriers. The downlink component carrier and the uplink component carrier are also referred to as "component carrier (carrier)".

For example, for one component carrier, one resource grid may be given. For one component carrier and a certain subcarrier spacing configuration µ, one resource grid may be given. Here, the subcarrier spacing configuration is also referred to as numerology. The resource grid includes $N^{size,\mu}_{grid1,x} N^{RB}_{sc}$ subcarriers. The resource grid starts from a common resource block $N^{start,\mu}_{grid1,x}$. The common resource block $N^{start,\mu}_{grid1,x}$ is also referred to as a reference point of the resource grid. The resource grid includes $N^{subframe,\mu}_{symb}$ OFDM symbols. x is a subscript indicating a transmission direction, and indicates one of a downlink or an uplink. For a set of a certain antenna port p, a certain subcarrier spacing configuration µ, and a certain transmission direction x, one resource grid is given.

$N^{size,\mu}_{grid1,x}$ and $N^{start,\mu}_{grid1,x}$ are given based at least on a higher layer parameter (CarrierBandwidth). The higher layer parameter is also referred to as an SCS specific carrier. One resource grid corresponds to one SCS specific carrier. One component carrier may include one or multiple SCS specific carriers. The SCS specific carrier may be included in system information. For each of the SCS specific carriers, one subcarrier spacing configuration may be given.

The SubCarrier Spacing (SCS) $\Delta f$ may be $\Delta f = 2^\mu \cdot 15$ kHz. For example, the subcarrier spacing configuration may indicate one of 0, 1, 2, 3, or 4.

FIG. 2 is an example illustrating a relationship between the subcarrier spacing configuration µ, the number of $N^{slot}_{symb}$ OFDM symbols per slot, and a cyclic prefix (CP) configuration according to an aspect of the present embodiment. In FIG. 2A, for example, in a case that the subcarrier spacing configuration is two and the CP configuration is a normal cyclic prefix (normal CP), $N^{slot}_{symb}=14$, $N^{frame,\mu}_{slot}=40$, and $N^{subframe,\mu}_{slot}=4$. In FIG. 2B, for example, in a case that the subcarrier spacing configuration µ is two and the CP configuration is an extended cyclic prefix (extended CP), $N^{slot}_{symb}=12$, $N^{frame,\mu}_{slot}=40$, and $N^{subframe,\mu}_{slot}=4$.

In the radio communication system according to an aspect of the present embodiment, time unit $T_c$ may be used for expression of the length of the time domain. For the time unit $T_c$, $T_c=1/(\Delta f_{max} \cdot N_f)$. $\Delta f_{max}=480$ kHz. $N_f=4096$. For a constant κ, $\kappa = \Delta f_{max} \cdot N_f/(\Delta f_{,ref} N_{f,ref})=64$. $\Delta f_r$ is 15 kHz. $N_{f,ref}$ is 2048.

Transmission of a signal in the downlink and/or transmission of a signal in the uplink may be organized into a radio frame (system frame, frame) having the length $T_f$. $T_f = (\Delta f_{max} N_f/100) \cdot T_s = 10$ ms. "·" represents multiplication. The radio frame includes 10 subframes. For the length $T_{sf}$ of the subframe, $T_{sf} = (\Delta f_{max} N_f/1000) \cdot T_s = 1$ ms. For the number of OFDM symbols per subframe, $N^{subframe,\mu}_{symb} = N^{slot}_{symb} N^{subframe,\mu}_{slot}$.

For a certain subcarrier spacing configuration µ, the number and indices of slots included in a subframe may be provided. For example, slot indices $n^\mu_s$ may be given in ascending order with integer values in the range from 0 to $N^{subframe,\mu}_{slot}-1$ in the subframe. For the subcarrier spacing configuration µ, the number and indices of slots included in the radio frame may be given. Slot indices $n^\mu_{s,f}$ may be given in ascending order with integer values in the range from 0 to $N^{frame,\mu}_{slot}-1$ in the radio frame. $N^{slot}_{symb}$ continuous OFDM symbols may be included in one slot. $N^{slot}_{symb}=14$.

Figure 3:
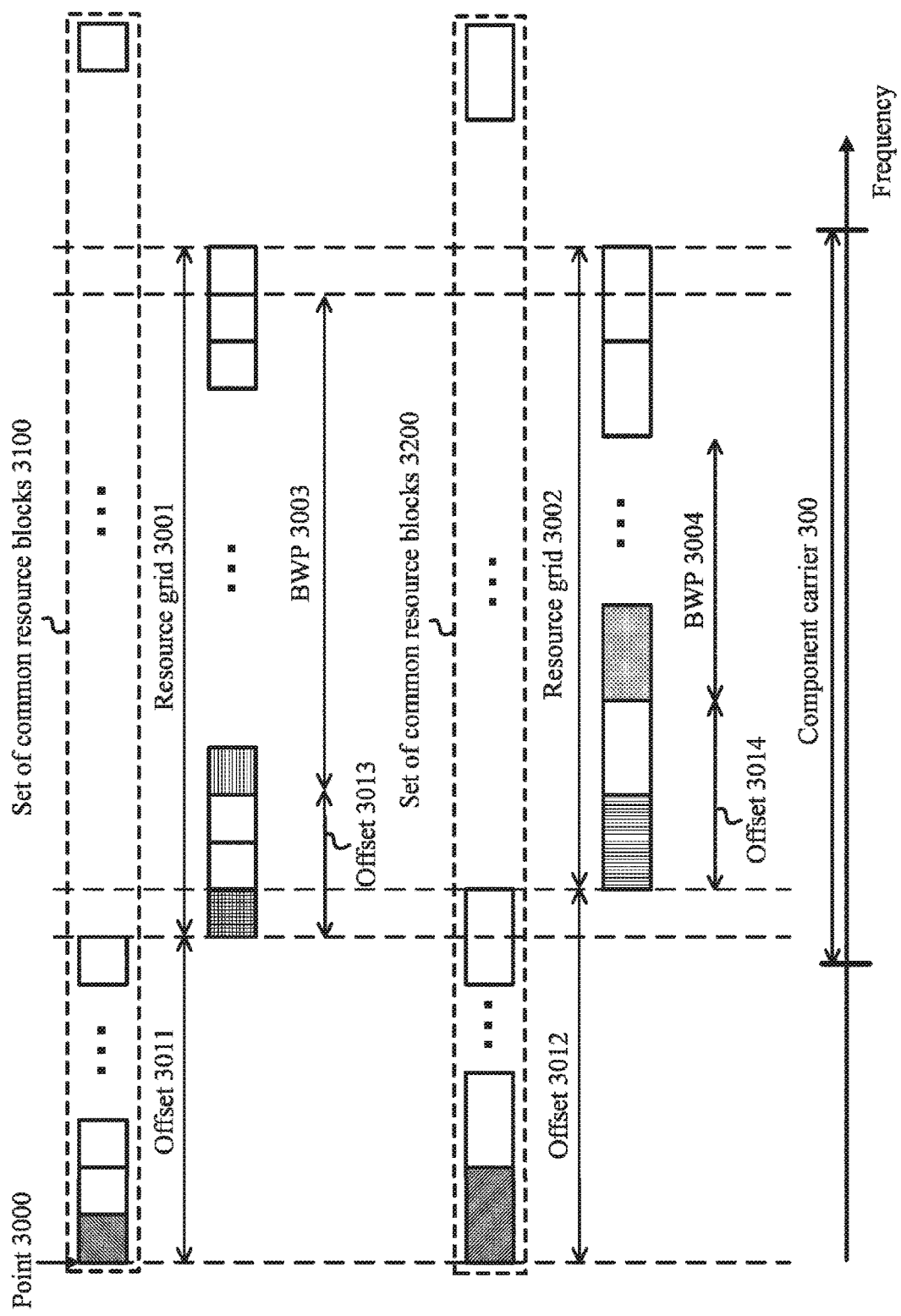
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing $\mu_1$ in a component carrier 300, and a configuration example of a resource grid of subcarrier spacing $\mu_2$ in the certain component carrier. As described above, for a certain component carrier, one or multiple subcarrier spacings may be configured. FIG. 3 assumes $\mu_1 = \mu_2 - 1$. However, various aspects of the present embodiment are not limited to the condition of $\mu_1 = \mu_2 - 1$.

The component carrier 300 is a band having a prescribed width in the frequency domain.

A Point 3000 is an identifier for identifying a certain subcarrier. The point 3000 is also referred to as a point A. A set 3100 of Common resource blocks (CRBs) is a set of common resource blocks for the subcarrier spacing configuration $\mu_1$.

Of the common resource block set 3100, a common resource block (block hatched with lines rising diagonally up and to the right in FIG. 3) including the point 3000 is also referred to as a reference point of the common resource block set 3100. The reference point of the common resource block set 3100 may be a common resource block having an index of 0 in the common resource block set 3100.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size,\mu}_{grid1,x}$ common resource blocks starting from the reference point of the resource grid 3001.

An offset 3013 is an offset from the reference point of the resource grid 3001 to a reference point ($N^{start,\mu}_{BWP,i1}$) of a BandWidth Part (BWP) 3003 having an index of i1.

A common resource block set 3200 is a set of common resource blocks for the subcarrier spacing configuration $\mu_2$.

Of the common resource block set 3200, a common resource block (block hatched with lines rising diagonally up and to the left in FIG. 3) including the point 3000 is also referred to as a reference point of the common resource block set 3200. The reference point of the common resource block set 3200 may be a common resource block having an index of 0 in the common resource block set 3200.

An offset 3012 is an offset from the reference point of the common resource block set 3200 to a reference point of a resource grid 3002. The offset 3012 is represented by the number of common resource blocks for the subcarrier spacing $\mu_2$. The resource grid 3002 includes $N^{size,\mu}_{grid2,x}$ common resource blocks starting from the reference point of the resource grid 3002.

An offset 3014 is an offset from the reference point of the resource grid 3002 to a reference point ($N^{start,\mu}_{BWP,i2}$) of a BWP 3004 having an index of i2.

Figure 4:
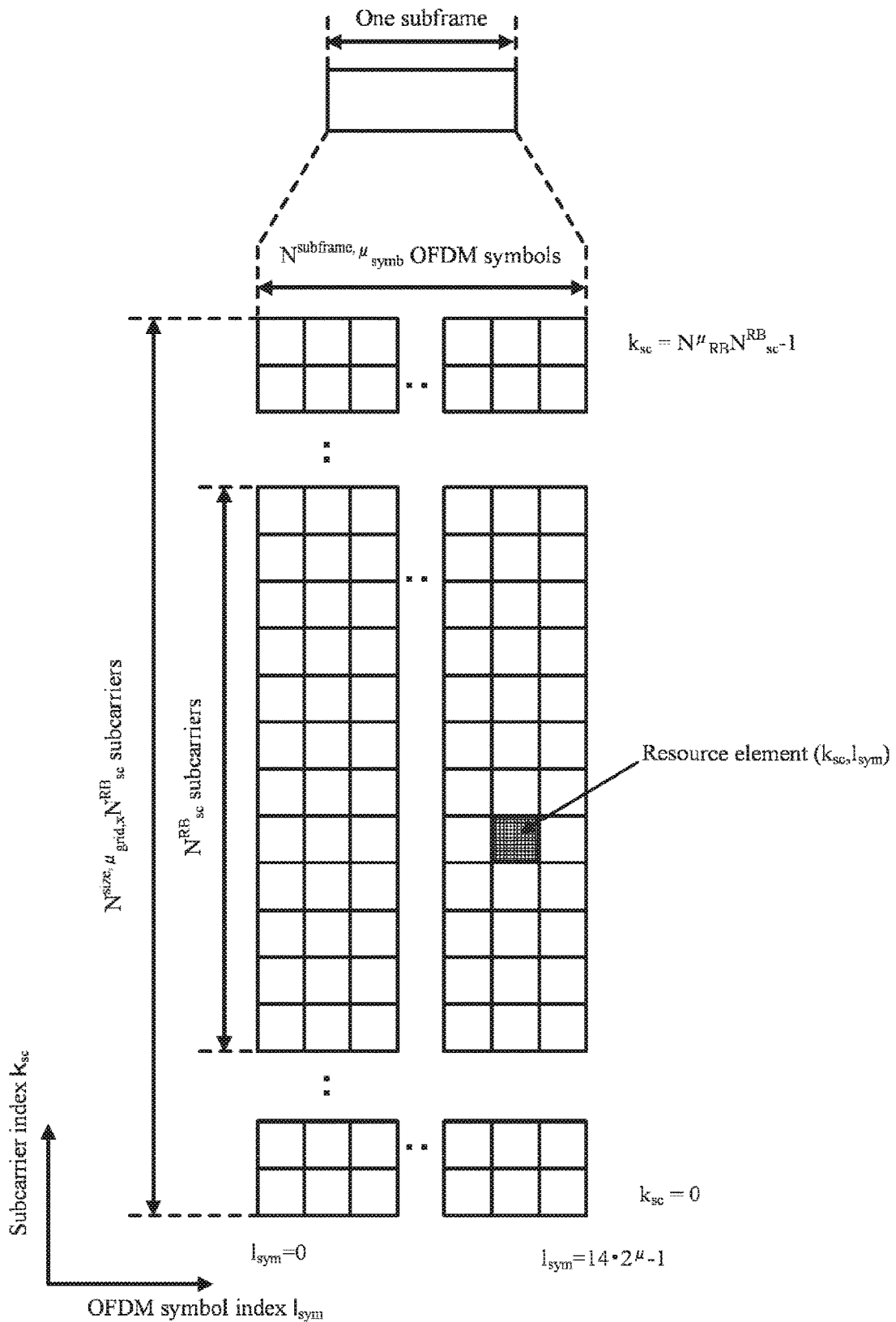
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $1_{sym}$, and the vertical axis corresponds to a subcarrier index $k_{sc}$. The resource grid 3001 includes $N^{size,\mu}_{grid1,x} N^{RB}_{sc}$ subcarriers, and $N^{subframe,\mu}_{symb}$ OFDM symbols. In the resource grid, a resource identified with the subcarrier index $k_{sc}$ and the OFDM symbol index $1_{sym}$ is also referred to as a Resource Element (RE).

The Resource Block (RB) includes $N^{RB}_{sc}$ continuous subcarriers. The resource block is a general term for a common resource block, a Physical Resource Block (PRB), and a Virtual Resource Block (VRB). Here, $N^{RB}_{sc}=12$.

A resource block unit is a set of resources corresponding to one OFDM symbol in one resource block. In other words, one resource block unit includes 12 resource elements corresponding to one OFDM symbol in one resource block.

The common resource blocks for a certain subcarrier spacing configuration µ are assigned with indices (indexing) in ascending order from 0 in the frequency domain in a certain common resource block set. The common resource block having an index of 0 for a certain subcarrier spacing configuration µ includes (or collides with, matches) the point 3000. An index $n^{\mu}_{CRB}$ of the common resource block for a certain subcarrier spacing configuration µ satisfies a relationship of $n^{\mu}_{CRB}=\text{ceil}(k_{sc}/N^{RB}_{sc})$. Here, a subcarrier with $k_{sc}=0$ is a subcarrier having the same center frequency as the center frequency of a subcarrier corresponding to the point 3000.

The physical resource blocks for a certain subcarrier spacing configuration µ are assigned with indices in ascending order from 0 in the frequency domain in a certain BWP. An index $n^{\mu}_{PRB}$ of the physical resource block for a certain subcarrier spacing configuration µ satisfies a relationship of $n^{\mu}_{CRB}=n^{\mu}_{PRB}+N^{start,\mu}_{BWP,i}$. Here, $N^{start,\mu}_{BWP,i}$ indicates a reference point of the BWP having an index of i.

The BWP is defined as a subset of common resource blocks included in the resource grid. The BWP includes $N^{size,\mu}_{BWP,i}$ common resource blocks starting from the reference point $N^{start,\mu}_{BWP,i}$ of the BWP. A BWP configured for a downlink carrier is also referred to as a downlink BWP. The BWP configured for the uplink component carrier is also referred to as an uplink BWP.

An antenna port may be defined by that a channel on which a symbol in a certain antenna port is conveyed can be inferred from a channel on which another symbol in the certain antenna port is conveyed (an antenna port is defined such that the channel over which a symbol on the antenna port is conveyed can be inferred from the channel over which another symbol on the same antenna port is conveyed). For example, the channel may correspond to a physical channel. The symbol may correspond to an OFDM symbol. The symbol may correspond to a resource block unit. The symbol may correspond to a resource element.

The fact that large scale property of a channel on which a symbol is conveyed in one antenna port can be inferred from a channel on which a symbol is conveyed in another antenna port is described that the two antenna ports are quasi co-located (QCL). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel through which a symbol is transmitted in one antenna port can be inferred from a channel through which a symbol is transmitted in another antenna port, the terminal apparatus 1 may assume that the two antenna ports are QCL. The fact that two antenna ports are QCL may mean that it is assumed that the two antenna ports are QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
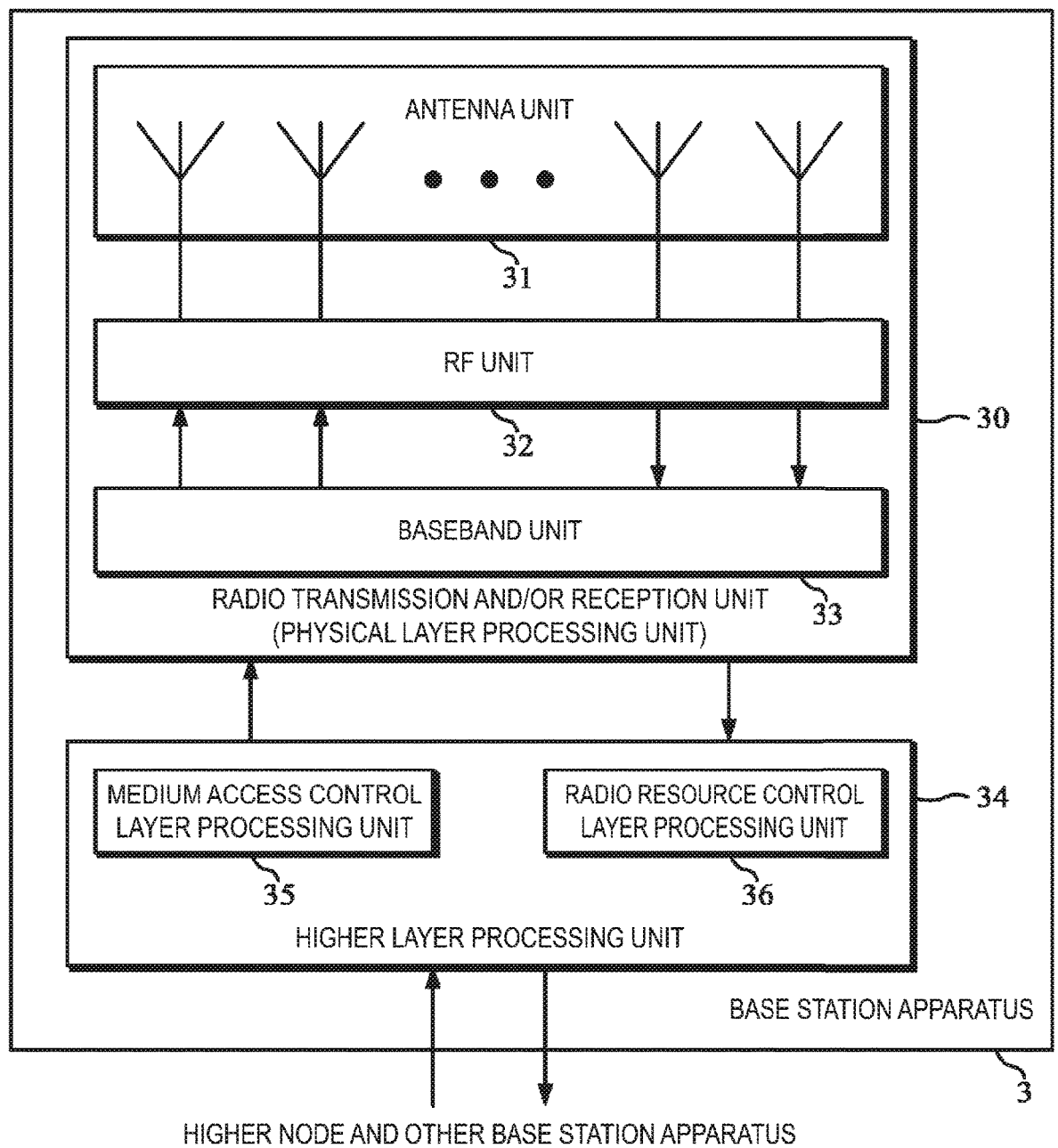
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 at least includes a part or all of a radio transmission and/or reception unit (physical layer processing unit) 30 and/or a higher layer processing unit 34. The radio transmission and/or reception unit 30 at least includes a part or all of an antenna unit 31, a Radio Frequency (RF) unit 32, and a baseband unit 33. The higher layer processing unit 34 at least includes a part or all of a medium access control layer processing unit 35 and a Radio Resource Control (RRC) layer processing unit 36.

The radio transmission and/or reception unit 30 at least includes a part or all of a radio transmitting unit 30a and a radio receiving unit 30b. Here, apparatus configurations of the baseband unit included in the radio transmitting unit 30a and the baseband unit included in the radio receiving unit 30b may be the same or different from each other. Apparatus configurations of the RF unit included in the radio transmitting unit 30a and the RF unit included in the radio receiving unit 30b may be the same or different from each other. Apparatus configurations of the antenna unit included in the radio transmitting unit 30a and the antenna unit included in the radio receiving unit 30b may be the same or different from each other.

For example, the radio transmitting unit 30a may generate and transmit a baseband signal of a PDSCH. For example, the radio transmitting unit 30a may generate and transmit a baseband signal of a PDCCH. For example, the radio transmitting unit 30a may generate and transmit a baseband signal of a PBCH. For example, the radio transmitting unit 30a may generate and transmit a baseband signal of a synchronization signal. For example, the radio transmitting unit 30a may generate and transmit a baseband signal of a PDSCH DMRS. For example, the radio transmitting unit 30a may generate and transmit a baseband signal of a PDCCH DMRS. For example, the radio transmitting unit 30a may generate and transmit a baseband signal of a CSI-RS. For example, the radio transmitting unit 30a may generate and transmit a baseband signal of a DL PTRS.

For example, the radio transmitting unit 30b may receive a PRACH. For example, the radio transmitting unit 30b may receive and demodulate a PUCCH. The radio transmitting unit 30b may receive and demodulate a PUSCH. For example, the radio transmitting unit 30b may receive a PUCCH DMRS. For example, the radio transmitting unit 30b may receive a PUSCH DMRS. For example, the radio transmitting unit 30b may receive a UL PTRS. For example, the radio transmitting unit 30b may receive an SRS.

The higher layer processing unit 34 outputs downlink data (transport block) to the radio transmission and/or reception unit 30 (or the radio transmitting unit 30a). The higher layer processing unit 34 performs processing of a Medium Access Control (MAC) layer, a Packet Data Convergence Protocol (PDCP) layer, a Radio Link Control (RLC) layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 manages various pieces of configuration information/parameters (RRC parameters) of the terminal apparatus 1. The radio resource control layer processing unit 36 sets the RRC parameter, based on an RRC message received from the terminal apparatus 1.

The radio transmission and/or reception unit 30 (or the radio transmitting unit 30a) performs processing such as modulation and coding. The radio transmission and/or reception unit 30 (or the radio transmitting unit 30a) performs modulation, coding, baseband signal generation (conversion into a time-continuous signal) on downlink data to generate a physical signal, and transmits the physical signal to the terminal apparatus 1. The radio transmission and/or reception unit 30 (or the radio transmitting unit 30a) may map the physical signal to a certain component carrier, and transmit the mapped physical signal to the terminal apparatus 1.

The radio transmission and/or reception unit 30 (or the radio receiving unit 30b) performs processing such as demodulation and decoding. The radio transmission and/or reception unit 30 (or the radio receiving unit 30b) separates, demodulates, and decodes a received physical signal, and outputs decoded information to the higher layer processing unit 34. The radio transmission and/or reception unit 30 (or the radio receiving unit 30b) may perform a channel access procedure prior to transmission of the physical signal.

The RF unit 32 converts (down-converts) a signal received via the antenna unit 31 into a baseband signal by means of orthogonal demodulation, and removes unnecessary frequency components. The RF unit 32 outputs a processed analog signal to the baseband unit.

The baseband unit 33 converts an analog signal input from the RF unit 32 into a digital signal. The baseband unit 33 removes a portion corresponding to a Cyclic Prefix (CP) from the converted digital signal, performs a Fast Fourier Transform (FFT) on the signal from which the CP has been removed, and extracts a signal in the frequency domain.

The baseband unit 33 performs Inverse Fast Fourier Transform (IFFT) on data to generate an OFDM symbol, adds a CP to the generated OFDM symbol, generates a baseband digital signal, and converts the baseband digital signal into an analog signal. The baseband unit 33 outputs the converted analog signal to the RF unit 32.

The RF unit 32 removes an unnecessary frequency component from the analog signal input from the baseband unit 33 by using a low-pass filter, up-converts the analog signal into a carrier frequency, and transmits the converted analog signal via the antenna unit 31. The RF unit 32 may have a function of controlling transmission power. The RF unit 32 is also referred to as a transmission power control unit.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization.

The SCell may be included in one of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP, and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP, and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain times, one downlink BWP may be active.

Among one or multiple uplink BWPs configured for the serving cell, two or more uplink BWPs need not be configured for the active uplink BWP. For the serving cell, at certain times, one uplink BWP may be active.

Figure 6:
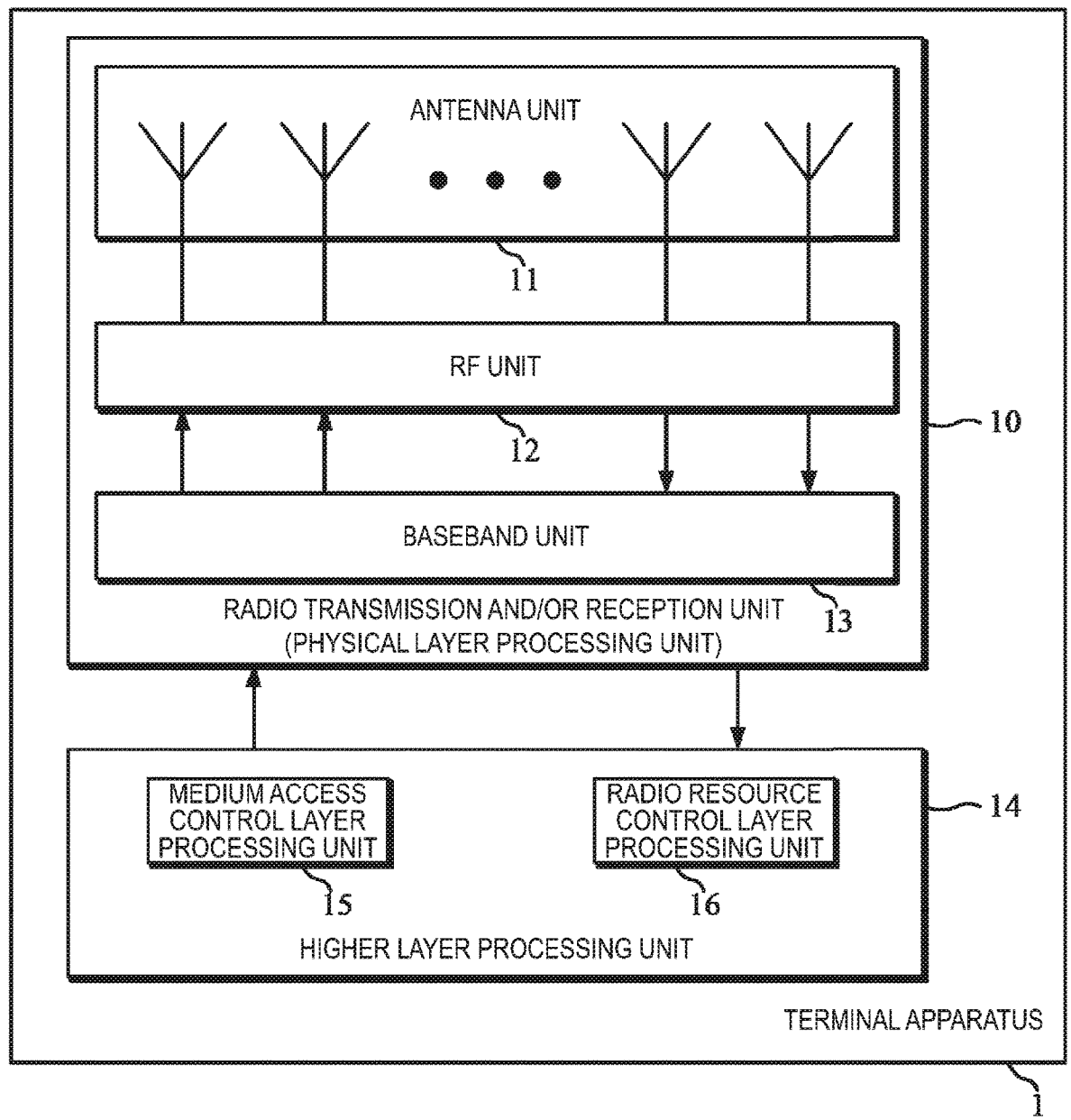
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 at least includes one or all of a radio transmission and/or reception unit (physical layer processing unit) 10 and a higher layer processing unit 14. The radio transmission and/or reception unit 10 at least includes a part or all of an antenna unit 11, an RF unit 12, and a baseband unit 13. The higher layer processing unit 14 at least includes a part or all of a medium access control layer processing unit 15 and a radio resource control layer processing unit 16.

The radio transmission and/or reception unit 10 at least includes a part or all of a radio transmitting unit 10a and a radio receiving unit 10b. Here, apparatus configurations of the baseband unit 13 included in the radio transmitting unit 10a and the baseband unit 13 included in the radio receiving unit 10b may be the same or different from each other. Apparatus configurations of the RF unit 12 included in the radio transmitting unit 10a and the RF unit 12 included in the radio receiving unit 10b may be the same or different from each other. Apparatus configurations of the antenna unit 11 included in the radio transmitting unit 10a and the antenna unit 11 included in the radio receiving unit 10b may be the same or different from each other.

For example, the radio transmitting unit 10a may generate and transmit a baseband signal of a PRACH. For example, the radio transmitting unit 10a may generate and transmit a baseband signal of a PUCCH. The radio transmitting unit 10a may generate and transmit a baseband signal of a PUSCH. For example, the radio transmitting unit 10a may generate and transmit a baseband signal of a PUCCH DMRS. For example, the radio transmitting unit 10a may generate and transmit a baseband signal of a PUSCH DMRS. For example, the radio transmitting unit 10a may generate and transmit a baseband signal of a UL PTRS. For example, the radio transmitting unit 10a may generate and transmit a baseband signal of an SRS.

For example, the radio receiving unit 10b may receive and demodulate a PDSCH. For example, the radio receiving unit 10b may receive and demodulate a PDCCH. For example, the radio receiving unit 10b may receive and demodulate a PBCH. For example, the radio receiving unit 10b may receive a synchronization signal. For example, the radio receiving unit 10b may receive a PDSCH DMRS. For example, the radio receiving unit 10b may receive a PDCCH DMRS. For example, the radio receiving unit 10b may receive a CSI-RS. For example, the radio receiving unit 10b may receive a DL PTRS.

The higher layer processing unit 14 outputs uplink data (transport block) to the radio transmission and/or reception unit 10 (or the radio transmitting unit 10a). The higher layer processing unit 14 performs processing of the MAC layer, the packet data convergence protocol layer, the radio link control layer, and the RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various pieces of configuration information/parameters (RRC parameters) of the terminal apparatus 1. The radio resource control layer processing unit 16 sets the RRC parameters, based on an RRC message received from the base station apparatus 3.

The radio transmission and/or reception unit 10 (or the radio transmitting unit 10a) performs processing such as modulation and coding. The radio transmission and/or reception unit 10 (or the radio transmitting unit 10a) performs modulation, coding, baseband signal generation (conversion into a time-continuous signal) on uplink data to generate a physical signal, and transmits the physical signal to the base station apparatus 3. The radio transmission and/or reception unit 10 (or the radio transmitting unit 10a) may map the physical signal to a certain BWP (active uplink BWP), and transmit the mapped physical signal to the base station apparatus 3.

The radio transmission and/or reception unit 10 (or the radio receiving unit 10b) performs processing such as demodulation and decoding. The radio transmission and/or reception unit 10 (or the radio receiving unit 30b) may receive a physical signal in a certain BWP (active downlink BWP) of a certain serving cell. The radio transmission and/or reception unit 10 (or the radio receiving unit 10b) separates, demodulates, and decodes the received physical signal, and outputs decoded information to the higher layer processing unit 14. The radio transmission and/or reception unit 10 (radio receiving unit 10b) may perform a channel access procedure prior to transmission of the physical signal.

The RF unit 12 converts (down-converts) a signal received via the antenna unit 11 into a baseband signal by means of orthogonal demodulation, and removes an unnecessary frequency component. The RF unit 12 outputs a processed analog signal to the baseband unit 13.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 performs inverse fast Fourier transform (IFFT) on uplink data to generate an OFDM symbol, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up-converts the analog signal into a signal of a carrier frequency, and transmits the up-converted signal via the antenna unit 11. The RF unit 12 may have a function of controlling transmission power. The RF unit 12 is also referred to as a transmission power control unit.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the radio communication system according to an aspect of the present embodiment, at least a part or all of the following uplink physical channels may be used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) at least includes a part or all of Channel State Information (CSI), a Scheduling Request (SR), and Hybrid Automatic Repeat request Acknowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as an HARQ-ACK information bit or an HARQ-ACK information sequence.

The HARQ-ACK information may at least include an HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared Channel (PUSCH)). The HARQ-ACK may indicate an acknowledgement (ACK) or a negative-acknowledgement (NACK) corresponding to the transport block. The ACK may indicate that decoding of the transport block has been completed successfully (has been decoded). The NACK may indicate that decoding of the transport block has not completed successfully (has not been decoded). The HARQ-ACK information may include an HARQ-ACK codebook including one or multiple HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for initial transmission (new transmission). The scheduling request bit may be used for indicating one of a positive SR or a negative SR. The scheduling request bit indicating the positive SR is also referred to as "the positive SR being transmitted". The positive SR may indicate that a resource of the PUSCH (or the UL-SCH) for initial transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for initial transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PM), and a Rank Indicator (RI). The CQI is an indicator associated with quality (for example, propagation strength) of a channel or quality of a physical channel, and the PMI is an indicator associated with a precoder. The RI is an indicator associated with a transmission rank (or the number of transmission layers).

The channel state information may be given based at least on reception of a physical signal (for example, a CSI-RS) at least used for channel measurement. The channel state information may be selected by the terminal apparatus 1, based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,v}(n)$ is defined by $x_{u,v}(n)=x_u(mod(n+C_v,L_{RA}))$. $x_u$ may be a Zadoff-Chu (ZC) sequence. $x_u$ is defined by $x_u=\exp(-j\pi ui(i+1)/L_{RA})$. j is an imaginary unit. $\pi$ is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. The random access preamble is identified (determined, given) based at least on the cyclic shift $C_v$ of the PRACH sequence and the sequence index u for the PRACH sequence.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the radio communication system according to an aspect of the present embodiment, at least a part or all of the following uplink physical signals may be used.

UpLink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS associated with the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated by one DCI format (or may be scheduled). The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a channel (propagation path) of the PUSCH may be inferred from the DMRS for the PUSCH.

A set of antenna ports of the DMRS for the PUCCH (DMRS associated with the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated by one DCI format (or may be triggered). Mapping of the PUCCH to resource elements (resource element mapping) and/or mapping of the DMRS for the PUCCH to resource elements may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a channel of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or multiple higher layer parameters.

The physical layer control information includes 8 bits. The physical layer control information may at least include a part or all of the following 0A to 0D.

0A) Radio frame bit
0B) Half radio frame (half system frame, half frame) bit
0C) SS/PBCH block index bit
0D) Subcarrier offset bit The radio frame bit is used for indicating a radio frame in which the PBCH is transmitted (radio frame including a slot in which the PBCH is transmitted). The radio frame bit includes 4 bits. The radio frame bit may include 4 bits of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

DCI format 0_0, DCI format 0_1, DCI format 1_0, and DCI format 1_1 are DCI formats including a set of fields different from each other. An uplink DCI format is a general term for DCI format 0_0 and DCI format 0_1. A downlink DCI format is a general term for DCI format 1_0 and DCI format 1_1.

DCI format 0_0 is at least used for scheduling the PUSCH of a certain cell (or mapped to a certain cell). DCI format 0_0 at least includes a part or all of fields from 1A to 1E.

1A) DCI format identification field (Identifier field for DCI formats)
1B) Frequency domain resource allocation field (Frequency domain resource assignment field)

1C) Time domain resource allocation field (Time domain resource assignment field)
1D) Frequency hopping flag field
1E) Modulation and Coding Scheme field (MCS field)

The DCI format identification field may indicate whether the DCI format including the DCI format identification field is an uplink DCI format or a downlink DCI format. The DCI format identification field included in DCI format 0_0 may indicate 0 (or may indicate that DCI format 0_0 is an uplink DCI format).

The frequency domain resource allocation field included in DCI format 0_0 may be at least used for indicating allocation of frequency resources for the PUSCH.

The time domain resource allocation field included in DCI format 0_0 may be at least used for indicating allocation time resources for the PUSCH.

The frequency hopping flag field may be at least used for indicating whether or not frequency hopping is applied to the PUSCH.

The MCS field included in DCI format 0_0 may be at least used for indicating a part or all of a modulation scheme for the PUSCH and/or a target coding rate. The target coding rate may be a target coding rate for the transport block of the PUSCH. The size of the transport block (Transport Block Size (TBS)) of the PUSCH may be given based at least on a part or all of the target coding rate and the modulation scheme for the PUSCH.

DCI format 0_0 need not include a field used for a CSI request. In other words, CSI need not be requested using DCI format 0_0.

DCI format 0_0 need not include a carrier indicator field. In other words, the uplink component carrier to which the PUSCH scheduled using DCI format 0_0 is mapped may be the same as the uplink component carrier to which the PDCCH including DCI format 0_0 is mapped.

DCI format 0_0 need not include the BWP field. In other words, the uplink BWP to which the PUSCH scheduled using DCI format 0_0 is mapped may be the same as the uplink BWP to which the PDCCH including DCI format 00 is mapped.

DCI format Oils at least used for scheduling of the PUSCH of a certain cell (mapped to a certain cell). DCI format 0_1 at least includes a part or all of fields of 2A to 2H.

2A) DCI format identification field
2B) Frequency domain resource allocation field
2C) Uplink time domain resource allocation field
2D) Frequency hopping flag field
2E) MCS field
2F) CSI request field
2G) BWP field
2H) Carrier indicator field The DCI format identification field included in DCI format 0_1 may indicate 0 (or may indicate that DCI format 0_i is an uplink DCI format).

The frequency domain resource allocation field included in DCI format 0_1 may be at least used for indicating allocation of frequency resources for the PUSCH.

The time domain resource allocation field included in DCI format 0_1 may be at least used for indicating allocation time resources for the PUSCH.

The MCS field included in DCI format 0_I may be at least used for indicating a part or all of a modulation scheme for the PUSCH and/or a target coding rate.

In a case that the BWP field is included in DCI format 0_1, the BWP field may be used for indicating an uplink BWP to which the PUSCH is mapped. In a case that the BWP field is not included in DCI format 0_i, the uplink BWP to which the PUSCH is mapped may be the same as the uplink BWP to which the PDCCH including DCI format 0_i used for scheduling of the PUSCH is mapped. In a case that the number of uplink BWPs configured for the terminal apparatus 1 in a certain uplink component carrier is two or more, the number of bits of the BWP field included in DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in DCI format 0_1 used for scheduling of the PUSCH mapped to the certain uplink component carrier may be 0 bits (or the BWP field need not be included in DCI format 0_1 used for scheduling of the PUSCH mapped to the certain uplink component carrier).

The CST request field is at least used for indicating the report of the CSI.

In a case that the carrier indicator field is included in DCI format 0_1, the carrier indicator field may be used for indicating the uplink component carrier to which the PUSCH is mapped. In a case that the carrier indicator field is not included in DCI format 0_1, the uplink component carrier to which the PUSCH is mapped may be the same as the uplink component carrier to which the PDCCH including DCI format 0_I used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in DCI format 0_1 used for scheduling of the PUSCH mapped to the certain serving cell group may be 0 bits (or the carrier indicator field need not be included in DCI format 0_l used for scheduling of the PUSCH mapped to the certain serving cell group).

DCI format 1_0 is at least used for scheduling of the PDSCH of a certain cell (mapped to a certain cell). DCI format 1_0 at least includes a part or all of 3A to 3F.

3A) DCI format identification field
3B) Frequency domain resource allocation field
3C) Time domain resource allocation field
3D) MCS field
3E) PDSCH_HARQ feedback timing indication field (PDSCH to HARQ feedback timing indicator field)
3F) PUCCH resource indication field (PUCCH resource indicator field)

The DCI format identification field included in DCI format 1_0 may indicate 1 (or may indicate that DCI format 1_0 is a downlink DCI format).

The frequency domain resource allocation field included in DCI format 1_0 may be at least used for indicating allocation of frequency resources for the PDSCH.

The time domain resource allocation field included in DCI format 1_0 may be at least used for indicating allocation of time resources for the PDSCH.

The MCS field included in DCI format 1_0 may be at least used for indicating a part or all of a modulation scheme for the PDSCH and/or a target coding rate. The target coding rate may be a target coding rate for the transport block of the PDSCH. The size of the transport block (Transport Block Size (TBS)) of the PDSCH may be given based at least on a part or all of the target coding rate and the modulation scheme for the PDSCH.

The PDSCH_HARQ feedback timing indication field may be at least used for indicating an offset from the slot including the last OFDM symbol of the PDSCH to the slot including the first OFDM symbol of the PUCCH.

The PUCCH resource indication field may be a field indicating an index of one of one or multiple PUCCH resources included in a PUCCH resource set. The PUCCH resource set may include one or multiple PUCCH resources.

DCI format 1_0 need not include the carrier indicator field. In other words, the downlink component carrier to which the PDSCH scheduled using DCI format 1_0 is mapped may be the same as the downlink component carrier to which the PDCCH including DCI format 1_0 is mapped.

DCI format 1_0 need not include the BWP field. In other words, the downlink BWP to which the PDSCH scheduled using DCI format 1_0 is mapped may be the same as the downlink BWP to which the PDCCH including DCI format 1_0 is mapped.

DCI format 1_1 is at least used for scheduling the PDSCH of a certain cell (or mapped to a certain cell). DCI format 1_1 at least includes a part or all of 4A to 4I.

4A) DCI format identification field
4B) Frequency domain resource allocation field
4C) Time domain resource allocation field
4E) MCS field
4F) PDSCH_HARQ feedback timing indication field
4G) PUCCH resource indication field
4H) BWP field
4I) Carrier indicator field The DCI format identification field included in DCI format 1_1 may indicate 1 (or may indicate that DCI format 1_1 is a downlink DCI format).

The frequency domain resource allocation field included in DCI format 1_1 may be at least used for indicating allocation of frequency resources for the PDSCH.

The time domain resource allocation field included in DCI format 1_1 may be at least used for indicating allocation of time resources for the PDSCH.

The MCS field included in DCI format 1_1 may be at least used for indicating a part or all of the modulation scheme for the PDSCH and/or the target coding rate.

In a case that the PDSCH_HARQ feedback timing indication field is included in DCI format 1_1, the PDSCH_HARQ feedback timing indication field may be at least used for indicating an offset from the slot including the last OFDM symbol of the PDSCH to the slot including the first OFDM symbol of the PUCCH. In a case that the PDSCH_HARQ feedback timing indication field is not included in DCI format 1_1, an offset from the slot including the last OFDM symbol of the PDSCH to the slot including the first OFDM symbol of the PUCCH may be identified by a higher layer parameter.

The PUCCH resource indication field may be a field indicating an index of one of one or multiple PUCCH resources included in a PUCCH resource set.

In a case that the BWP field is included in DCI format 1_1, the BWP field may be used for indicating the downlink BWP to which the PDSCH is mapped. In a case that the BWP field is not included in DCI format 1_1, the downlink BWP to which the PDSCH is mapped may be the same as the downlink BWP to which the PDCCH including DCI format 1_1 used for scheduling of the PDSCH is mapped. In a case that the number of downlink BWPs configured for the terminal apparatus 1 in a certain downlink component carrier is two or more, the number of bits of the BWP field included in DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in DCI format 1_1 used for scheduling of the PDSCH mapped to the certain downlink component carrier may be 0 bits (or the BWP field need not be included in DCI format 1_1 used for scheduling of the PDSCH mapped to the certain downlink component carrier).

In a case that the carrier indicator field is included in DCI format 1_1, the carrier indicator field may be used for indicating the downlink component carrier to which the PDSCH is mapped. In a case that the carrier indicator field is not included in DCI format 1_1, the downlink component carrier to which the PDSCH is mapped may be the same as the downlink component carrier to which the PDCCH including DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in DCI format 1_1 used for scheduling of the PDSCH mapped to the certain serving cell group may be 0 bits (or the carrier indicator field need not be included in DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the radio communication system according to an aspect of the present embodiment, at least a part or all of the following downlink physical signals may be used.

Synchronization Signal (SS)
DownLink DeModulation Reference Signal (DL DMRS)
Channel State Information-Reference Signal (CSI-RS)
DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
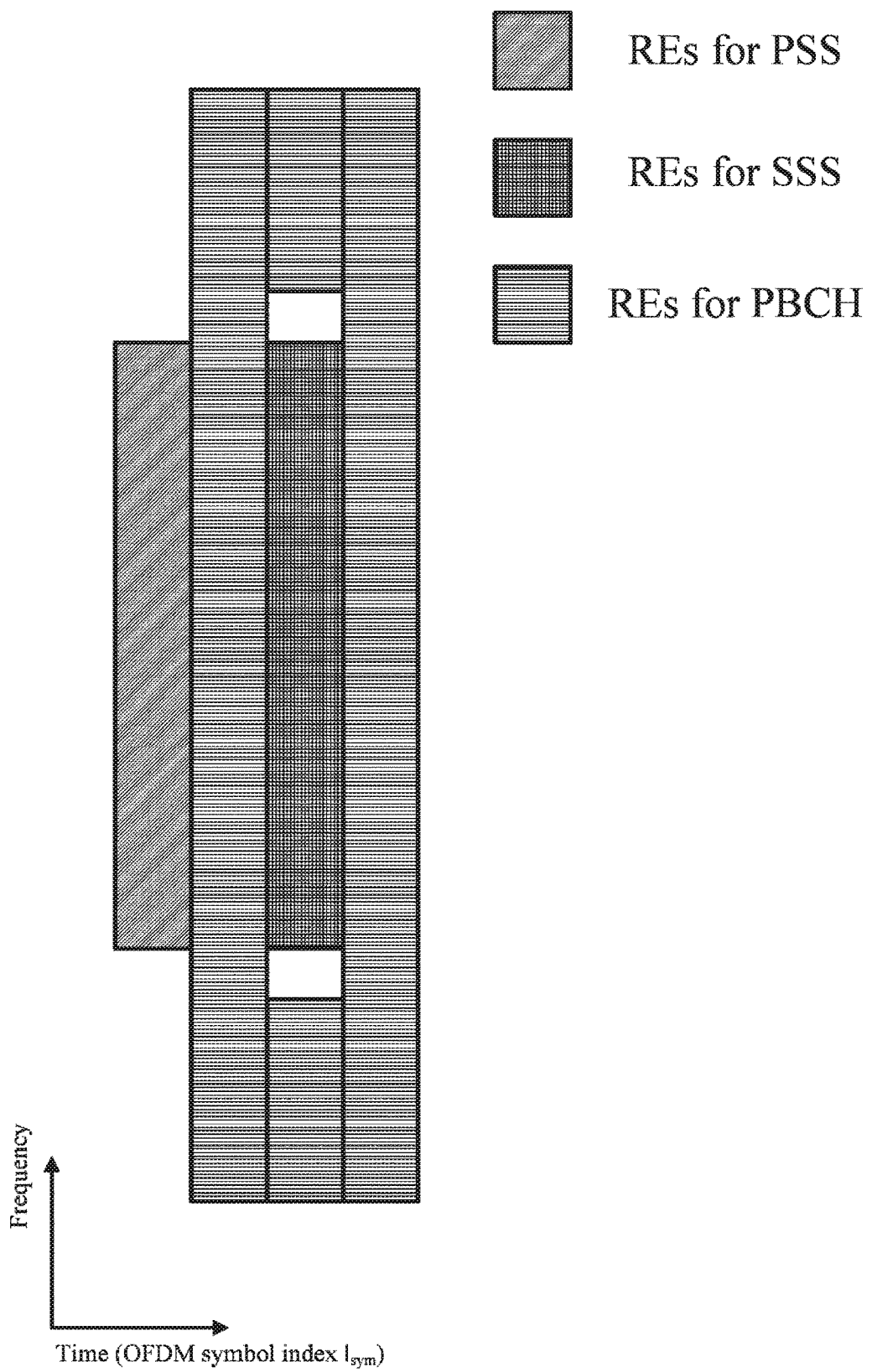
FIG. 7 is a diagram illustrating a configuration example of an SS/PBCH block according to an aspect of the present embodiment.

FIG. 7 is a diagram illustrating a configuration example of the SS/PBCH block according to an aspect of the present embodiment. In FIG. 7, the horizontal axis corresponds to a time axis (OFDM symbol index $1_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS associated with the PBCH, DMRS included in the PBCH, DMRS corresponding to the PBCH).

As illustrated in FIG. 7, the SS/PBCH block includes the PSS, the SSS, and the PBCH. The SS/PBCH block includes four continuous OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. The 1st to 56th subcarriers of the first OFDM symbol may be set equal to zero. The 184th to 240th subcarriers of the first OFDM symbol may be set equal to zero. The 49th to 56th subcarriers of the third OFDM symbol may be set equal to zero. The 184th to 192nd subcarriers of the third OFDM symbol may be set equal to zero. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH on which the symbol of the PBCH in a certain antenna port is conveyed may be inferred by the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS associated with the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a channel of the PDSCH may be inferred from the DMRS for the PDSCH. In a case that a set of resource elements in which the symbol of a certain PDSCH and a set of resource elements in which the symbol of the DMRS for the certain PDSCH is conveyed are included in the same Precoding Resource Group (PRG), the PDSCH on which the symbol of the PDSCH in a certain antenna port is conveyed may be inferred by the DMRS for the PDSCH.

The antenna port of the DMRS for the PDCCH (DMRS associated with the PDCCH, DMRS included in the PDCCH, DMRS corresponding to the PDCCH) may be the same as the antenna port for the PDCCH.

The PDCCH may be inferred from the DMRS for the PDCCH. In other words, a channel of the PDCCH may be inferred from the DMRS for the PDCCH. In a case that the same precoder is applied to a set of resource elements in which the symbol of a certain PDCCH is conveyed and a set of resource elements in which the symbol of the DMRS for the certain PDCCH is conveyed (assumed to be applied), the PDCCH on which the symbol of the PDCCH in a certain antenna port is conveyed may be inferred by the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. A Common Control CHannel (CCCH) may be used for transmitting a common RRC message in multiple terminal apparatuses 1. Here, the CCCH may be, for example, used for the terminal apparatus 1 that is not in a state of RRC connection. A Dedicated Control CHannel (DCCH) may be at least used for transmitting a dedicated RRC message to the terminal apparatus 1. Here, the DCCH may be, for example, used for the terminal apparatus 1 that is in a state of RRC connection.

The RRC message includes one or multiple RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a specific RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Control Element (MAC CE). In other words, the higher layer parameter is a general term for an MIB, system information, a message corresponding to the CCCH, a message corresponding to the DCCH, and information included in the MAC CE.

Procedures performed by the terminal apparatus 1 at least include a part or all of the following 5A to 5C.

5A) Cell search
5B) Random access
5C) Data communication

The cell search is a procedure in which synchronization with a certain cell related to the time domain and the frequency domain is performed by the terminal apparatus 1, which is used for detecting a physical cell identity (physical cell ID). In other words, the terminal apparatus 1 may perform synchronization with a certain cell in the time domain and the frequency domain by means of cell search, and detect a physical cell ID.

A sequence of the PSS is given based at least on the physical cell ID. A sequence of the SSS is given based at least on the physical cell ID.

An SS/PBCH block candidate indicates a resource allowed to (capable of, scheduled to, configured to, defined to, having a possibility of) transmit the SS/PBCH block.

A set of SS/PBCH block candidates in a certain half radio frame is also referred to as an SS burst set. The SS burst set is also referred to as a transmission window, an SS transmission window, or a Discovery Reference Signal transmission window (DRS transmission window). The SS burst set is a general term at least including a first SS burst set and a second SS burst set.

The base station apparatus 3 transmits SS/PBCH blocks with one or multiple indices in a prescribed period. The terminal apparatus 1 may detect at least one SS/PBCH block out of the SS/PBCH blocks with one or multiple indices, and attempt decoding of the PBCH included in the SS/PBCH block.

The random access is a procedure at least including a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions, based at least on the index of the SS/PBCH block candidate detected based on cell search.

A configuration of the PRACH occasion may at least include a part or all of a PRACH configuration period (PCF) $T_{PCF}$, the number $N^{PCF}_{RO,t}$ of PRACH occasions included in a certain PRACH configuration period in the time domain, the number $N^{PCF}_{RO,f}$ of PRACH occasions included in the frequency domain, the number $N^{RO}_{preamble}$ of random access preambles allocated for random access for each PRACH occasion, the number $N^{SSB}_{preamble,CBRA}$ of preambles allocated for each index of the SS/PBCH block candidate for Contention Based Random Access (CBRA), and the number $N^{SSB}_{RO}$ of PRACH occasions allocated for each index of the SS/PBCH block candidate for contention based random access.

Based at least on the configuration of the PRACH occasion, a part or all of time resources and frequency resources of a certain PRACH occasion may be given.

A relationship (association) between the index of the SS/PBCH block candidate corresponding to the SS/PBCH block detected by the terminal apparatus 1 and the PRACH occasion may be given based at least on first bitmap information (first bitmap) indicating the index of the SS/PBCH block candidate actually used for transmission of the SS/PBCH block. Based at least on the first bitmap information indicating the index of the SS/PBCH block candidate actually used for transmission of the SS/PBCH block, the terminal apparatus 1 may determine a relationship (association) between the index of the SS/PBCH block candidate corresponding to the SS/PBCH block detected by the terminal apparatus 1 and the PRACH occasion. Each element of the first bitmap information may correspond to the index of a certain SS/PBCH block candidate. For example, the first element of the first bitmap information may correspond to the SS/PBCH block candidate whose index of the SS/PBCH block candidate is 0. For example, the second element of the first bitmap information may correspond to the SS/PBCH block candidate whose index of the SS/PBCH block candidate is 1. For example, the $L_{SSB}$-th element of the first bitmap information may correspond to the SS/PBCH block candidate whose index of the SS/PBCH block candidate is $L_{SSB}-1$. $L_{SSB}$ is the number of SS/PBCH blocks included in one SS burst set (for example, the first SS burst set).

Figure 8:
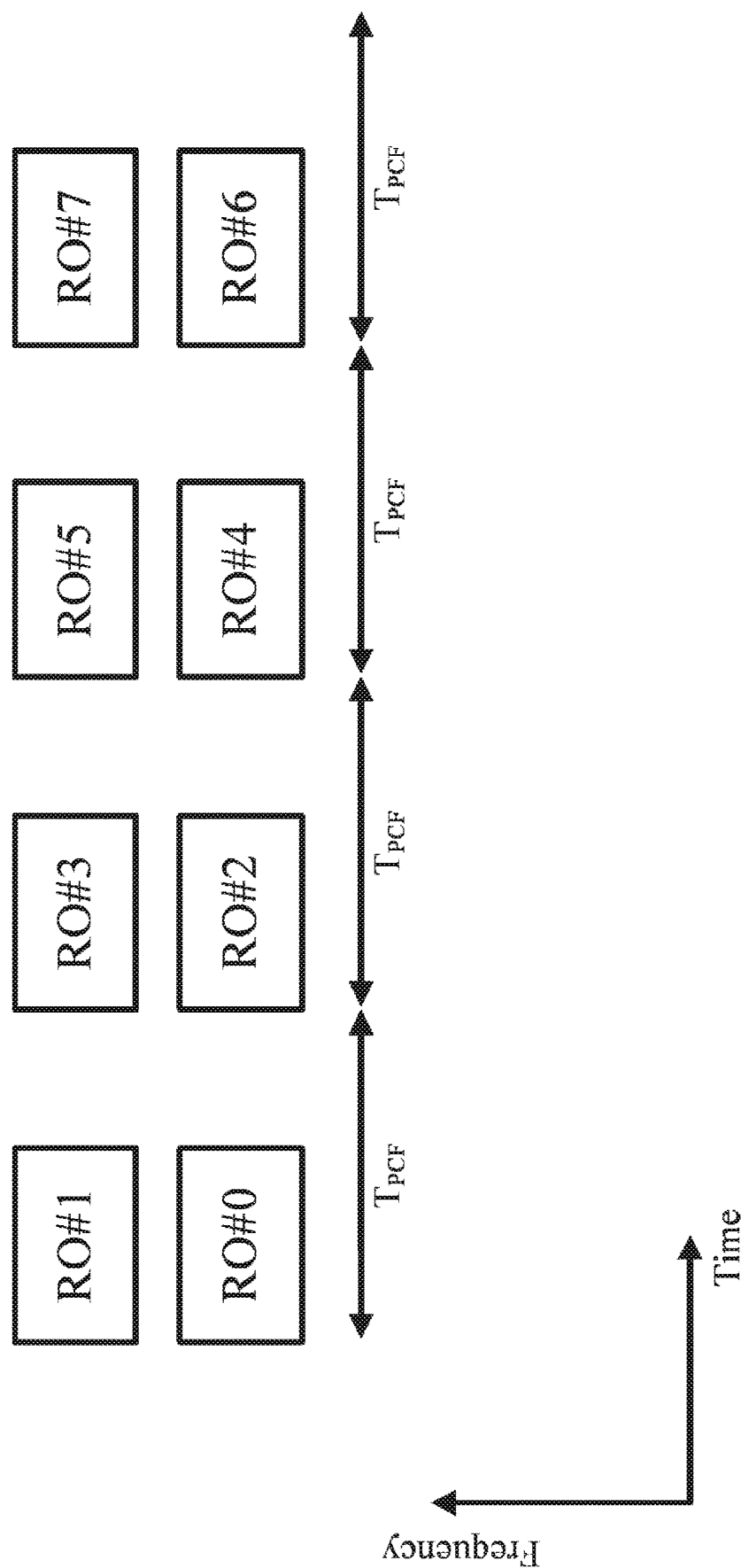
FIG. 8 is a diagram illustrating a configuration example of PRACH resources according to an aspect of the present embodiment.

FIG. 8 is a diagram illustrating a configuration example of PRACH resources according to an aspect of the present embodiment. In FIG. 8, the PRACH configuration period $T_{PCF}$ is 40 ms, the number $N^{PCF}_{RO,t}$ of PRACH occasions included in a certain PRACH configuration period in the time domain is 1, and the number $N_{RO,f}$ of PRACH occasions included in the frequency domain is configured to 2.

For example, the first bitmap information (ssb-PositionInBurst) indicating the index of the SS/PBCH block candidate actually used for transmission of the SS/PBCH block is set equal to {1, 1, 0, 1, 0, 1, 0, 0}.

Figure 9:
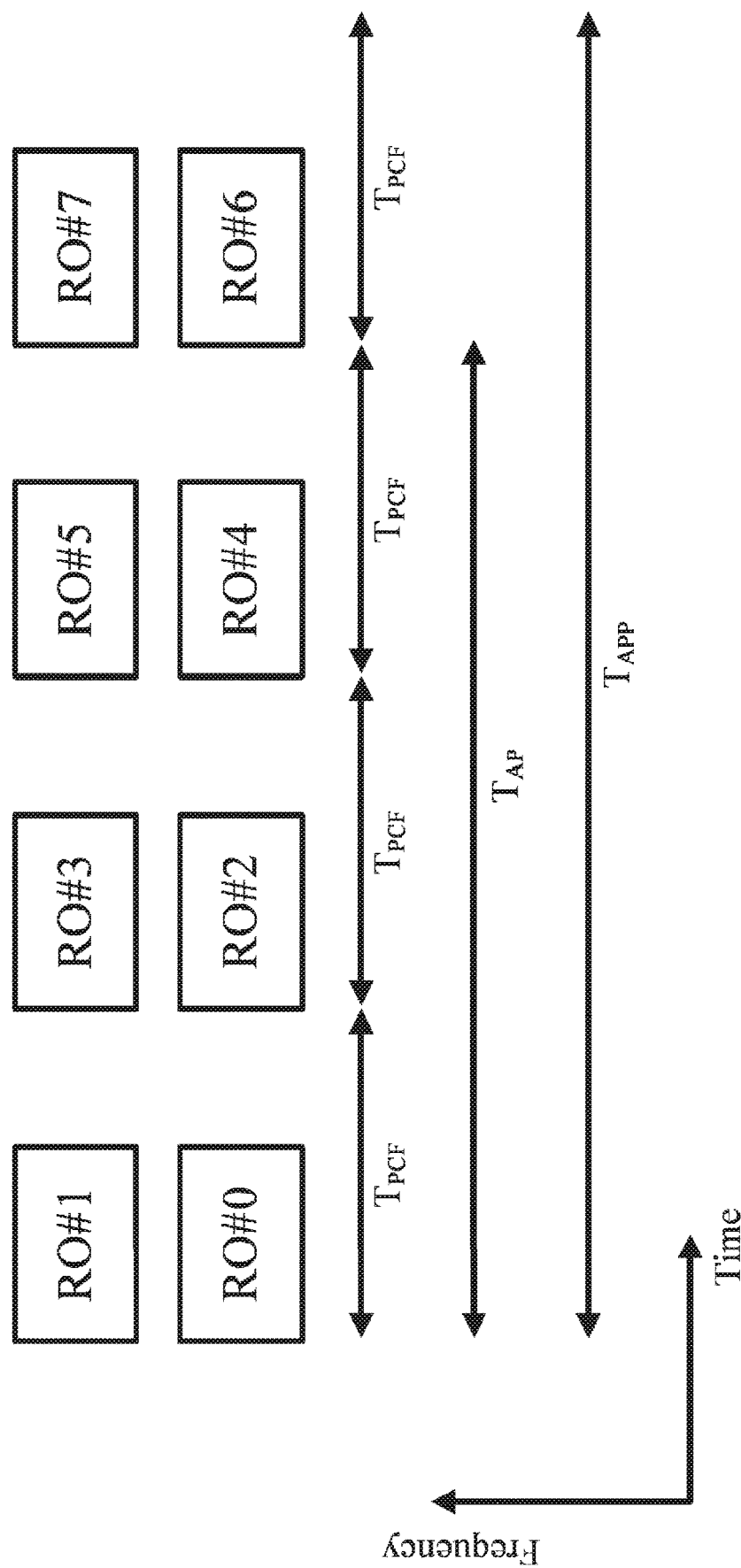
FIG. 9 is a diagram illustrating an example of a relationship (SS-RO association) between an index of an SS/PBCH block candidate and a PRACH occasion in a case that 1) the number $N^{RO}_{preamble}$ of random access preambles allocated for random access for each PRACH occasion is 64, 2) the number $N^{SSB}_{preamble,CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) first bitmap information is set equal to {1, 1, 0, 1, 0, 1, 1, 0} according to an aspect of the present embodiment.

FIG. 9 is a diagram illustrating an example of a relationship (SS-RO association) between the index of the SS/PBCH block candidate and the PRACH occasion in a case that 1) the number $N^{RO}_{preamble}$ of random access preambles allocated for random access for each PRACH occasion is 64, 2) the number $N^{SSB}_{preamble,CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) the first bitmap information is set equal to {1, 1, 0, 1, 0, 1, 1, 0} according to an aspect of the present embodiment. In FIG. 9, it is assumed that the configuration of the PRACH occasion is the same as that of FIG. 8. In FIG. 9, the SS/PBCH block candidate having an index of 0 may correspond to the PRACH occasion (RO #0) having an index of 0, the SS/PBCH block candidate having an index of 1 may correspond to the PRACH occasion (RO #1) having an index of 1, the SS/PBCH block candidate having an index of 3 may correspond to the PRACH occasion (RO #2) having an index of 2, the SS/PBCH block candidate having an index of 5 may correspond to the PRACH occasion (RO #3) having an index of 3, and the SS/PBCH block candidate having an index of 6 may correspond to the PRACH occasion (RO #4)) having an index of 4. In FIG. 9, a PRACH association period (PRACH AP) $T_{AP}$ is 120 ms including the PRACH occasions (RO #0 to RO #5) from index 0 to index 4. In FIG. 9, a PRACH Association Pattern Period (PRACH APP) $T_{APP}$ is 160 ms. In FIG. 9, the PRACH association pattern period includes one PRACH association period.

Figure 10:
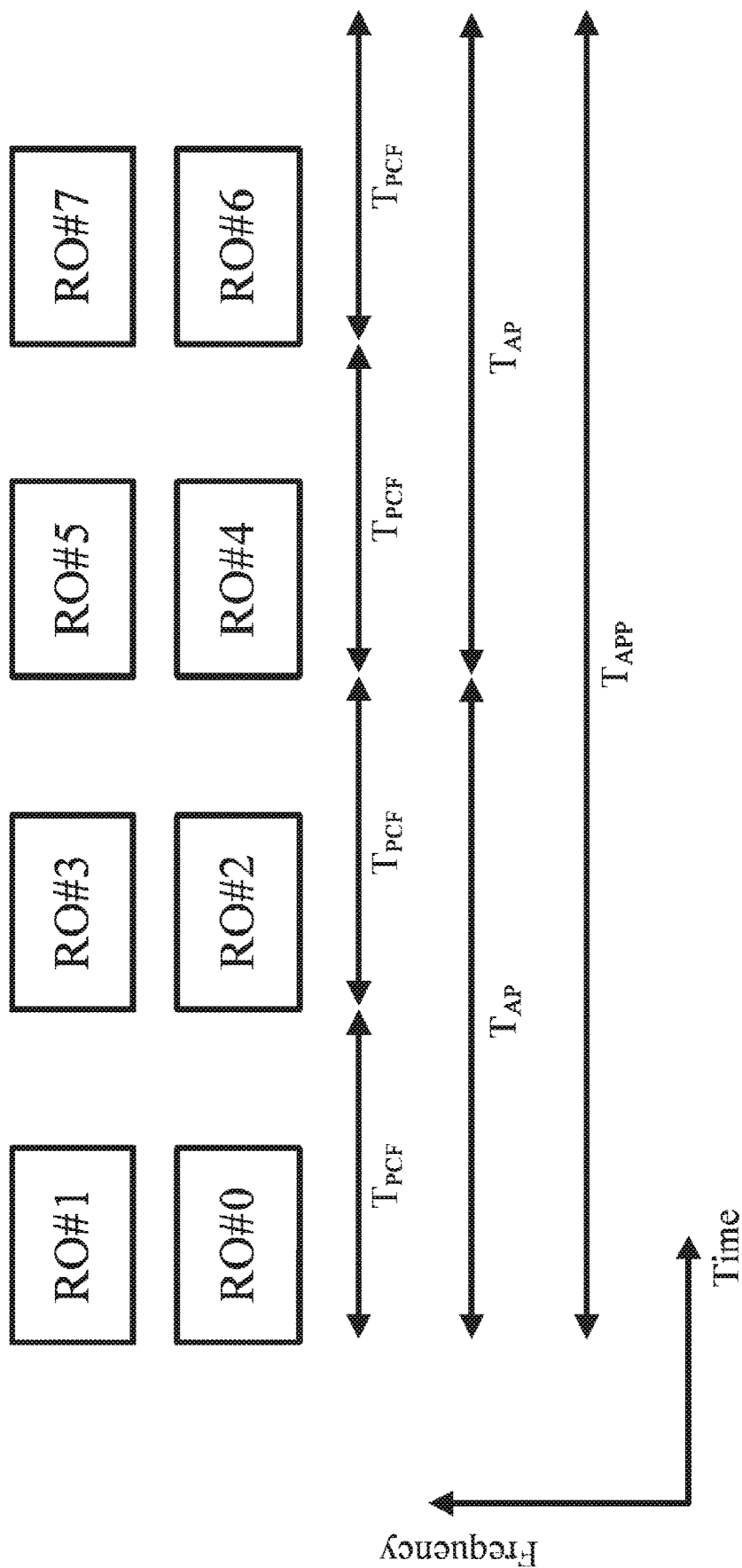
FIG. 10 is a diagram illustrating an example of a relationship between the index of the SS/PBCH block candidate and the PRACH occasion in a case that 1) the number $N^{RO}_{preamble}$ of random access preambles allocated for random access for each PRACH occasion is 64, 2) the number $N^{SSB}_{preamble,CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) the first bitmap information is set equal to {1, 1, 0, 1, 0, 1, 0, 0} according to an aspect of the present embodiment.

FIG. 10 is a diagram illustrating an example of a relationship between the index of the SS/PBCH block candidate and the PRACH occasion in a case that 1) the number $N^{RO}_{preamble}$ of random access preambles allocated for random access for each PRACH occasion is 64, 2) the number $N^{SSB}_{preamble,CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) the first bitmap information is set equal to {1, 1, 0, 1, 0, 1, 0, 0} according to an aspect of the present embodiment. In FIG. 10, it is assumed that the configuration of the PRACH occasion is the same as that of FIG. 8. In FIG. 10, the SS/PBCH block candidate having an index of 0 may correspond to the PRACH occasion (RO #0) having an index of 0 and the PRACH occasion (RO #4) having an index of 4, the SS/PBCH block candidate having an index of 1 may correspond to the PRACH occasion (RO #1) having an index of 1 and the PRACH occasion (RO #5) having an index of 5, the SS/PBCH block candidate having an index of 3 may correspond to the PRACH occasion (RO #2) having an index of 2 and the PRACH occasion (RO #6) having an index of 6, and the SS/PBCH block candidate having an index of 5 may correspond to the PRACH occasion (RO #3) having an index of 3 and the PRACH occasion (RO #7) having an index of 7. In FIG. 10, the PRACH association period $T_{AP}$ is 80 ms including the PRACH occasions (RO #0 to RO #3) from index 0 to index 3. In FIG. 10, the PRACH Association Pattern Period (PRACH APP) $T_{APP}$ is 160 ms. In FIG. 10, the PRACH association pattern period includes two PRACH association periods.

The "SS/PBCH block candidate actually used for transmission of the SS/PBCH block" having the smallest index out of N "SS/PBCH block candidates actually used for transmission of the SS/PBCH block" indicated by the first bitmap information may correspond to the first PRACH occasion (PRACH occasion having an index of 0). The n-th index out of N "SS/PBCH block candidates actually used for transmission of the SS/PBCH block" indicated by the first bitmap information may correspond to the n-th PRACH occasion (PRACH occasion having an index of n−1).

The index of the PRACH occasion is assigned to the PRACH occasion included in the PRACH association pattern period, with the frequency axis being the first priority (Frequency-first time-second).

In a case that all of the N "SS/PBCH block candidates actually used for transmission of the SS/PBCH block" indicated by the first bitmap information are allocated so as to correspond to at least one PRACH occasion, the PRACH configuration period corresponding to at least one of the PRACH occasions corresponding to at least one "SS/PBCH block candidate actually used for transmission of the SS/PBCH block" is included. In FIG. 9, the PRACH occasions corresponding to at least one "SS/PBCH block candidate actually used for transmission of the SS/PBCH block" are RO #0 to RO #4, and the PRACH configuration period corresponding to at least one of the PRACH occasions corresponding to the at least one "SS/PBCH block candidate actually used for transmission of the SS/PBCH block" is the first three PRACH configuration periods. In FIG. 10, the PRACH occasions corresponding to at least one "SS/PBCH block candidate actually used for transmission of the SS/PBCH block" are RO #0 to RO #3, and the PRACH configuration period corresponding to at least one of the PRACH occasions corresponding to the at least one "SS/PBCH block candidate actually used for transmission of the SS/PBCH block" is the first two PRACH configuration periods.

In a case that a maximum integer k satisfying $T_{APP} > k*T_{AP}$ is two or greater, one PRACH association pattern period includes k PRACH association periods. In FIG. 10, the maximum integer k satisfying $T_{APP} > k*T_{AP}$ is 2, the first PRACH association period includes the first two PRACH configuration periods, and the second PRACH association period includes two PRACH configuration periods from the third PRACH configuration period.

The terminal apparatus 1 transmits one random access preamble selected out of the PRACH occasion corresponding to the index of the SS/PBCH block candidate in which the SS/PBCH block is detected.

The message 2 is a procedure in which detection of DCI format 1_0 with a Cyclic Redundancy Check (CRC) scrambled with a Random Access-Radio Network Temporary Identifier (RA-RNTI) by the terminal apparatus 1 is attempted. The terminal apparatus 1 attempts detection of the PDCCH including the DCI format in a control resource set given based on the MIB included in the PBCH included in the SS/PBCH block detected based on cell search, and resources indicated based on a configuration of a search space set.

The message 3 is a procedure in which the PUSCH scheduled using a random access response grant included in DCI format 1_0 detected through the procedure of the message 2 is transmitted. Here, the random access response grant is indicated by the MAC CE included in the PDSCH scheduled using DCI format 1_0.

The PUSCH scheduled based on the random access response grant is one of a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled using DCI format 0_0 with a CRC scrambled based on a Temporary Cell-Radio Network Temporary Identifier (TC-RNTI).

The message 4 is a procedure in which detection of DCI format 1_0 with a CRC scrambled based on one of a Cell-Radio Network Temporary Identifier (C-RNTI) or a TC-RNTI is attempted. The terminal apparatus 1 receives the PDSCH scheduled based on DCI format 1_0. The PDSCH may include a contention resolution ID.

Data communication is a general term for downlink communication and uplink communication.

In data communication, the terminal apparatus 1 attempts detection of the PDCCH (monitors the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping), or may include distributed resources (interleaver mapping).

A set of resource blocks constituting the control resource set may be indicated by a higher layer parameter. The number of OFDM symbols constituting the control resource set may be indicated by a higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set, or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is associated with (included in, corresponds to) a certain control resource set. The index of the control resource set associated with the search space set may be indicated by a higher layer parameter.

For a certain search space set, a part or all of 6A to 6C may be indicated by at least a higher layer parameter.

6A) Monitoring interval of the PDCCH (PDCCH monitoring periodicity)
6B) Monitoring pattern of the PDCCH in a slot (PDCCH monitoring pattern within a slot)
6C) Monitoring offset of the PDCCH (PDCCH monitoring offset)

The monitoring occasion of a certain search space set may correspond to the OFDM symbol to which the first OFDM symbol of the control resource set associated with the certain search space set is mapped. The monitoring occasion of a certain search space set may correspond to a resource of the control resource set starting from the first OFDM symbol of the control resource set associated with the certain search space set. The monitoring occasion of the search space set is given based at least on a part or all of the monitoring periodicity of the PDCCH, the monitoring pattern of the PDCCH in a slot, and the monitoring offset of the PDCCH.

Figure 11:
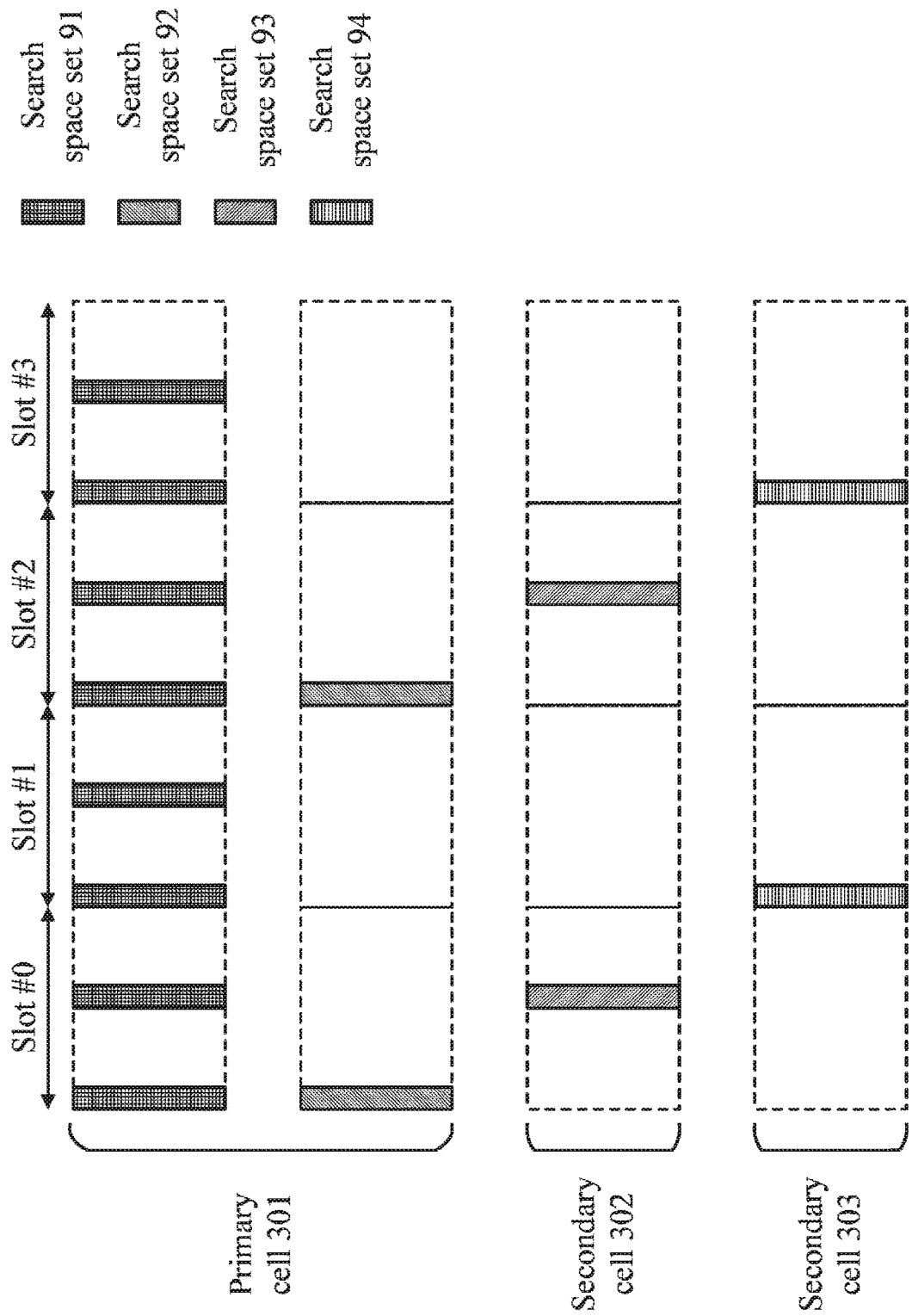
FIG. 11 is a diagram illustrating an example of monitoring occasions of search space sets according to an aspect of the present embodiment.

FIG. 11 is a diagram illustrating an example of the monitoring occasion for the search space set according to an aspect of the present embodiment. In FIG. 11, a search space set 91 and a search space set 92 are configured in a primary cell 301, a search space set 93 is configured in a secondary cell 302, and a search space set 94 is configured in a secondary cell 303.

In FIG. 11, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set equal to one slot, the monitoring offset of the search space set 91 is set equal to zero slot, and the monitoring pattern of the search space set 91 is set equal to [1, 0, 0, 0, 0, 0, 0, 1, 0, 0, 0, 0, 0, 0]. In other words, the monitoring occasion for the search space set 91 corresponds to the first OFDM symbol (OFDM symbol #0) and the eighth OFDM symbol (OFDM symbol #7) in each of the slots.

The monitoring periodicity of the search space set 92 is set equal to two slots, the monitoring offset of the search space set 92 is set equal to zero slot, and the monitoring pattern of the search space set 92 is set equal to [1, 0, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set equal to two slots, the monitoring offset of the search space set 93 is set equal to zero slot, and the monitoring pattern of the search space set 93 is set equal to [0, 0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set equal to two slot, the monitoring offset of the search space set 94 is set equal to one slot, and the monitoring pattern of the search space set 94 is set equal to [1, 0, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a Cell-Radio Network Temporary Identifier (C-RNTI).

The UE-specific PDCCH search space set may be at least used for the DCI format with a CRC sequence scrambled with a C-RNTI.

In downlink communication, the terminal apparatus 1 detects a downlink DCI format. The detected downlink DCI format is at least used for resource allocation of the PDSCH. The detected downlink DCI format is also referred to as downlink allocation (downlink assignment). The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In uplink communication, the terminal apparatus 1 detects an uplink DCI format. The detected DCI format is at least used for resource allocation of the PUSCH. The detected uplink DCI format is also referred to as an uplink grant. The terminal apparatus 1 performs transmission of the PUSCH.

The base station apparatus 3 and the terminal apparatus 1 may perform a Channel access procedure in a serving cell c, and perform transmission of a transmission wave (Transmission) in the serving cell c. For example, the serving cell c may be a serving cell configured in an unlicensed band. The transmission wave is a signal transmitted from the base station apparatus 3 or the terminal apparatus 1 to a medium.

The base station apparatus 3 and the terminal apparatus 1 may perform a channel access procedure in a carrier f of the serving cell c, and perform transmission of a transmission wave in the carrier f of the serving cell c. The carrier f is a carrier included in the serving cell c. The carrier f may include a set of resource blocks given based on a higher layer parameter.

The base station apparatus 3 and the terminal apparatus 1 may perform a channel access procedure in the carrier f of the serving cell c, and perform transmission of a transmission wave in a band part b of the carrier f of the serving cell c. The band part b is a subset of bands included in the carrier f.

The base station apparatus 3 and the terminal apparatus 1 may perform a channel access procedure in the band part b of the carrier f of the serving cell c, and perform transmission of a transmission wave in the carrier f of the serving cell c. A fact that transmission of a transmission wave is performed in the carrier f of the serving cell c may mean that the transmission wave is transmitted in one of the band parts included in the carrier f of the serving cell c.

The base station apparatus 3 and the terminal apparatus 1 may perform a channel access procedure in the band part b of the carrier f of the serving cell c, and perform transmission of a transmission wave in the band part b of the carrier f of the serving cell c.

The channel access procedure may at least include one or both of first measurement (first sensing) and a count procedure. A first channel access procedure may include the first measurement. The first channel access procedure need not include the count procedure. A second channel access procedure may at least include both of the first measurement and the count procedure. The channel access procedure is a term including a part or all of the first channel access procedure and the second channel access procedure.

After the first channel access procedure is performed, a transmission wave at least including the SS/PBCH block may be transmitted. After the first channel access procedure is performed, a transmission wave at least including a part or all of the SS/PBCH block, the PDSCH including broadcast information, the PDCCH including the DCI format used for scheduling of the PDSCH, and the CSI-RS may be transmitted. After the second channel access procedure is performed, a transmission wave at least including the PDSCH including information other than broadcast information may be transmitted. The PDSCH including broadcast information may at least include a part or all of the PDSCH including system information, the PDSCH including paging information, and the PDSCH (message 2 and/or message 4) used for random access.

The transmission wave at least including a part or all of the SS/PBCH block, the PDSCH including broadcast information, the PDCCH including the DCI format used for scheduling of the PDSCH, and the CSI-RS is also referred to as a Discovery Reference Signal (DRS). The DRS may be a signal transmitted after the first channel access procedure.

In a case that a period of the DRS is a prescribed length or less, and a duty ratio (duty cycle) of the DRS is a prescribed value or less, a transmission wave including the DRS may be transmitted after the first channel access procedure is performed. In a case that the period of the DRS exceeds the prescribed length, the transmission wave including the DRS may be transmitted after the second channel access procedure is performed. In a case that the duty ratio of the DRS exceeds the prescribed value, the transmission wave including the DRS may be transmitted after the second channel access procedure is performed. For example, the prescribed length may be 1 ms. The prescribed value may be 1/20.

A fact that a transmission wave is transmitted after the channel access procedure is performed may mean that the transmission wave is transmitted based on the channel access procedure. A fact that a transmission wave is transmitted after the channel access procedure is performed may mean that the transmission wave is transmitted in a case that a fact that a channel can be transmitted is given based on the channel access procedure.

The first measurement may be a measurement in which a fact that a Medium is Idle is detected in one or multiple LBT slot periods (LBT slot duration) out of a defer period (defer duration). Here, Listen Before Talk (LBT) may be a procedure in which whether a medium is idle or Busy is given based on carrier sense. The carrier sense may be a procedure in which Energy detection is performed in a medium. For example, "busy" may be a state in which an energy amount detected by means of carrier sense is larger than a prescribed threshold. Further, "idle" may be a state in which the energy amount detected by means of carrier sense is smaller than the prescribed threshold. A fact that the energy amount detected by means of carrier sense is equal to the prescribed threshold may be "idle". A fact that the energy amount detected by means of carrier sense is equal to the prescribed threshold may be "busy".

Being idle may be not being busy. Being busy may be not being idle.

The LBT slot period is a unit of LBT. For each LBT slot period, whether a medium is idle or busy may be given. For example, the LBT slot period may be 9 microseconds.

The defer period may at least include a period $T_f$ and one or multiple LBT slot periods. The length of the defer period is referred to as $T_d$. For example, the period $T_f$ may be 16 microseconds.

Figure 12:
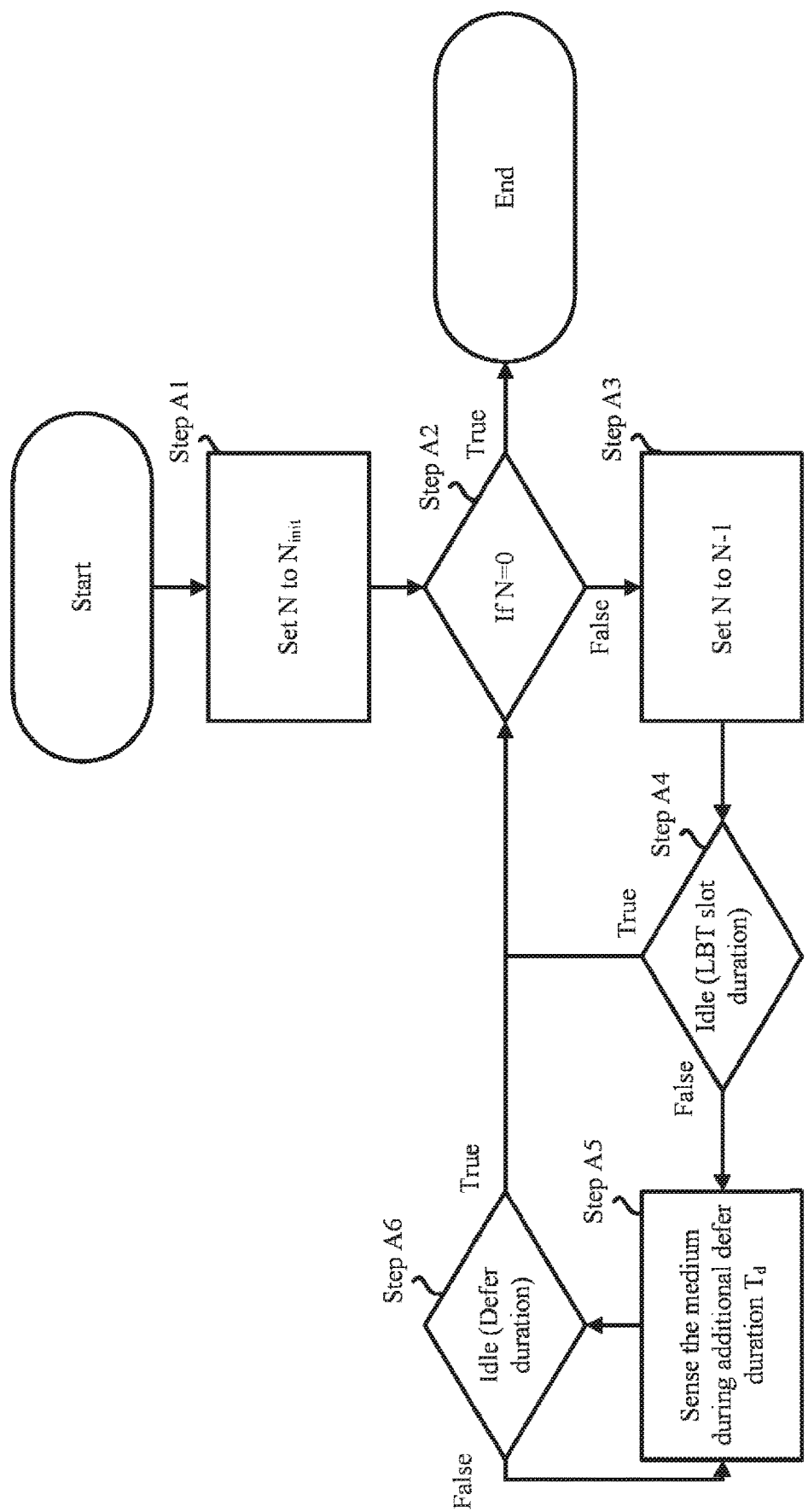
FIG. 12 is a diagram illustrating an example of a count procedure according to an aspect of the present embodiment.

FIG. 12 is a diagram illustrating an example of the count procedure according to an aspect of the present embodiment. The count procedure at least includes a part or all of step A1 to step A6. Step A1 includes operation of setting a value of a counter N equal to $N_{init}$. Here, $N_{init}$ is a value randomly (or pseudo-randomly) selected out of integer values included in the range from 0 to CWp. CWp is a Contention Window Size (CWS) for a channel access priority class p.

In step A2, whether or not the value of the counter N is 0 is determined. Step A2 includes operation of completing (or ending) the channel access procedure in a case that the counter N is 0. Step A2 includes operation of proceeding to step A3 in a case that the counter N is different from 0. Here, True in FIG. 12 corresponds to a case that an evaluation expression is True in a step including operation of determining the evaluation expression. False corresponds to a case that an evaluation expression is false in a step including operation of determining the evaluation expression. In step A2, the evaluation expression corresponds to counter N=0.

For example, step A3 may include a step of decrementing the value of the counter N. To decrement the value of the counter N may mean that the value of the counter N is reduced by 1. In other words, to decrement the value of the counter N may mean that the value of the counter N is set equal to N−1.

For example, step A3 may include a step of decrementing the value of the counter N in a case that N>0. Step A3 may include a step of decrementing the value of the counter N in a case that the base station apparatus 3 or the terminal apparatus 1 selects to decrement the counter N. Step A3 may include a step of decrementing the value of the counter N in a case that N>0, and the base station apparatus 3 and the terminal apparatus 1 select to decrement the counter N.

For example, step A4 may include operation of performing carrier sense of a medium in an LBT slot period d, and proceeding to step A2 in a case that and the LBT slot period d is idle. Step A4 may include operation of proceeding to step A2 in a case that the LBT slot period d is determined as idle by means of carrier sense. Step A4 may include operation of performing carrier sense in the LBT slot period d, and proceeding to step A5 in a case that the LBT slot period d is busy. Step A4 may include operation of proceeding to step A5 in a case that the LBT slot period d is determined as busy by means of carrier sense. Here, the LBT slot period d may be an LBT slot period, which is an LBT slot period that follows the LBT slot period in which carrier sense is already performed in the count procedure. In step A4, the evaluation expression may correspond to a fact that the LBT slot period d is idle.

Step A5 includes operation of performing carrier sense until a fact that a medium is busy in a certain LBT slot period included in the defer period is detected, or until a fact that a medium is idle in all of the LBT slot periods included in the defer period is detected.

Step A6 includes operation of proceeding to step A5 in a case that a medium is detected as busy in a certain LBT slot period included in the defer period. Step A6 includes operation of proceeding to step A2 in a case that a fact that a medium is idle in all of the LBT slot periods included in the defer period is detected. In step A6, the evaluation expression may correspond to a fact that a medium is idle in the certain LBT slot period.

$CW_{min,p}$ indicates a minimum value in a range of possible values of the contention window size CWp for the channel access priority class p. $CW_{max,p}$ indicates a maximum value in a range of possible values of the contention window size CWp for the channel access priority class p. The contention window size CWp for the channel access priority class p is also referred to as CWp.

In a case that a transmission wave at least including a physical channel (for example, a PDSCH) associated with the channel access priority class p is transmitted, CWp is managed by the base station apparatus 3 or the terminal apparatus 1, and CWp is adjusted before step A1 of the count procedure (adjustment procedure of CWp is performed).

In a certain component carrier, New Radio—Unlicensed (NR-U) may be applied. In a certain serving cell, NR-U may be applied. A fact that NR-U is applied in a certain component carrier (or a certain serving cell) may at least include a technique (framework, configuration) including a part or all of the following element A1 to element A6.

Element A1: In the certain component carrier (or the certain serving cell), the second SS burst set is configured Element A2: The base station apparatus 3 transmits the second SS/PBCH block in the certain component carrier (or the certain serving cell)

Element A3: The terminal apparatus 1 receives the second SS/PBCH block in the certain component carrier (or the certain serving cell)

Element A4: The base station apparatus 3 transmits the PDCCH in the second Type 0 PDCCH common search space set in the certain component carrier (or the certain serving cell)

Element A5: The terminal apparatus 1 receives the PDCCH in the second Type 0 PDCCH common search space set in the certain component carrier (or the certain serving cell)

Element A6: A higher layer parameter (for example, a field included in the MIB) associated with NR-U indicates a first value (for example, 1)

In a certain component carrier, New Radio—Unlicensed (NR-U) need not be applied. In a certain serving cell, NR-U need not be applied. A fact that NR-U is not applied in a certain component carrier (or a certain serving cell) may at least include a technique (framework, configuration) including a part or all of the following element B1 to element B6.

Element B1: In the certain component carrier (or the certain serving cell), the first SS burst set is configured Element B2: The base station apparatus 3 transmits the first SS/PBCH block in the certain component carrier (or the certain serving cell)

Element B3: The terminal apparatus 1 receives the first SS/PBCH block in the certain component carrier (or the certain serving cell)

Element B4: The base station apparatus 3 transmits the PDCCH in the first Type 0 PDCCH common search space set in the certain component carrier (or the certain serving cell)

Element B5: The terminal apparatus 1 receives the PDCCH in the first Type 0 PDCCH common search space set in the certain component carrier (or the certain serving cell)

Element B6: A higher layer parameter (for example, a field included in the MIB) associated with NR-U indicates a value (for example, 0) different from the first value The certain component carrier may be configured in a licensed band. The certain serving cell may be configured in a licensed band. Here, a fact that the certain component carrier (or the certain serving cell) is configured in a licensed band may at least include a part or all of the following configuration 1 to configuration 3.

Configuration 1: A higher layer parameter indicating operation in a licensed band for the certain component carrier (or the certain serving cell) is given, or a higher layer parameter indicating operation in an unlicensed band for the certain component carrier (or the certain serving cell) is not given Configuration 2: The certain component carrier (or the certain serving cell) is configured so as to operate in a licensed band, or the certain component carrier (or the certain serving cell) is not configured so as to operate in an unlicensed band Configuration 3: The certain component carrier (or the certain serving cell) is included in a licensed band, or the certain component carrier (or the certain serving cell) is not included in an unlicensed band The licensed band may be such a band that the radio station license is required for the terminal apparatus that operates (is expected to operate) in the licensed band. The licensed band may be a band in which only terminal apparatuses manufactured by an operator (business entity, business, organization, company) with radio station license are allowed to operate. The unlicensed band may be such a band that the channel access procedure prior to transmission of the physical signal is not required.

The unlicensed band may be such a band that the radio station license is not required for the terminal apparatus that operates (is expected to operate) in the unlicensed band. The unlicensed band may be such a band in which terminal apparatuses manufactured by a part or all of an operator with the radio station license and/or an operator without the radio station license are allowed to operate. The unlicensed band may be such a band that the channel access procedure prior to transmission of the physical signal is required.

Whether or not NR-U is applied to the certain component carrier (or the certain serving cell) may be determined based on whether or not at least the certain component carrier (or the certain serving cell) is configured for a band that can be operated in the unlicensed band (for example, a band that can be operated only in the unlicensed band). For example, a list of bands designed for NR or carrier aggregation of NR may be defined. For example, in a case that a certain band is included in a band in which one or multiple bands in the list can be operated in the unlicensed band (for example, a band that can be operated only in the unlicensed band), NR-U may be applied to the certain band. In a case that a certain band is not included in a band in which one or multiple bands in the list can be operated in the unlicensed band (for example, a band that can be operated only in the unlicensed band), NR-U need not be applied to the certain band, and normal NR (for example, NR of release 15, or NR other than NR-U of release 16) may be applied.

Whether or not NR-U is applied to the certain component carrier (or the certain serving cell) may be determined based on whether or not at least the component carrier (or the serving cell) is configured for a band in which NR-U can be operated (for example, a band that can be operated only in NR-U). For example, in a case that the list of bands designed for operation of NR or carrier aggregation of NR is defined, and one or multiple bands in the list is defined as a band in which NR-U can be operated (for example, a band in which only NR-U can be operated), NR-U is applied for a case that a band configured for the component carrier (or the serving cell) is one of the one or multiple bands, and for a case it is a band other than the one or multiple bands, NR-U is not applied, and normal NR (for example, NR of release 15, or NR other than NR-U of release 16) may be applied.

Whether or not NR-U is applied to the certain component carrier (or the certain serving cell) may be determined based on information included in the system information (for example, the Master Information Block (MIB, or the Physical Broadcast Channel (PBCH))). For example, in a case that the MIB includes information indicating whether or not NR-U is applied, and the information indicates application of NR-U, NR-U may be applied to the serving cell corresponding to the MIB. In contrast, in a case that the information does not indicate application of NR-U, NR-U need not be applied to the serving cell corresponding to the MIB, and normal NR may be applied. Alternatively, the information may indicate whether or not operation is possible in the unlicensed band.

The certain component carrier may be configured in the unlicensed band. The certain serving cell may be configured in the unlicensed band. Here, a fact that the certain component carrier (or the certain serving cell) is configured in the unlicensed band may at least include a part or all of the following configuration 4 to configuration 6.

Configuration 4: A higher layer parameter indicating operation in the unlicensed band is given to the certain component carrier (or the certain serving cell)

Configuration 5: The certain component carrier (or the certain serving cell) is configured so as to operate in the unlicensed band Configuration 6: The certain component carrier (or the certain serving cell) is included in the unlicensed band The following description will be given based on the assumption that NR-U is applied or NR-U is not applied to the component carrier. Note that "NR-U is applied to the component carrier" may mean "NR-U is applied to the serving cell", and "NR-U is not applied to the component carrier" may mean "NR-U is not applied to the serving cell".

Figure 13:
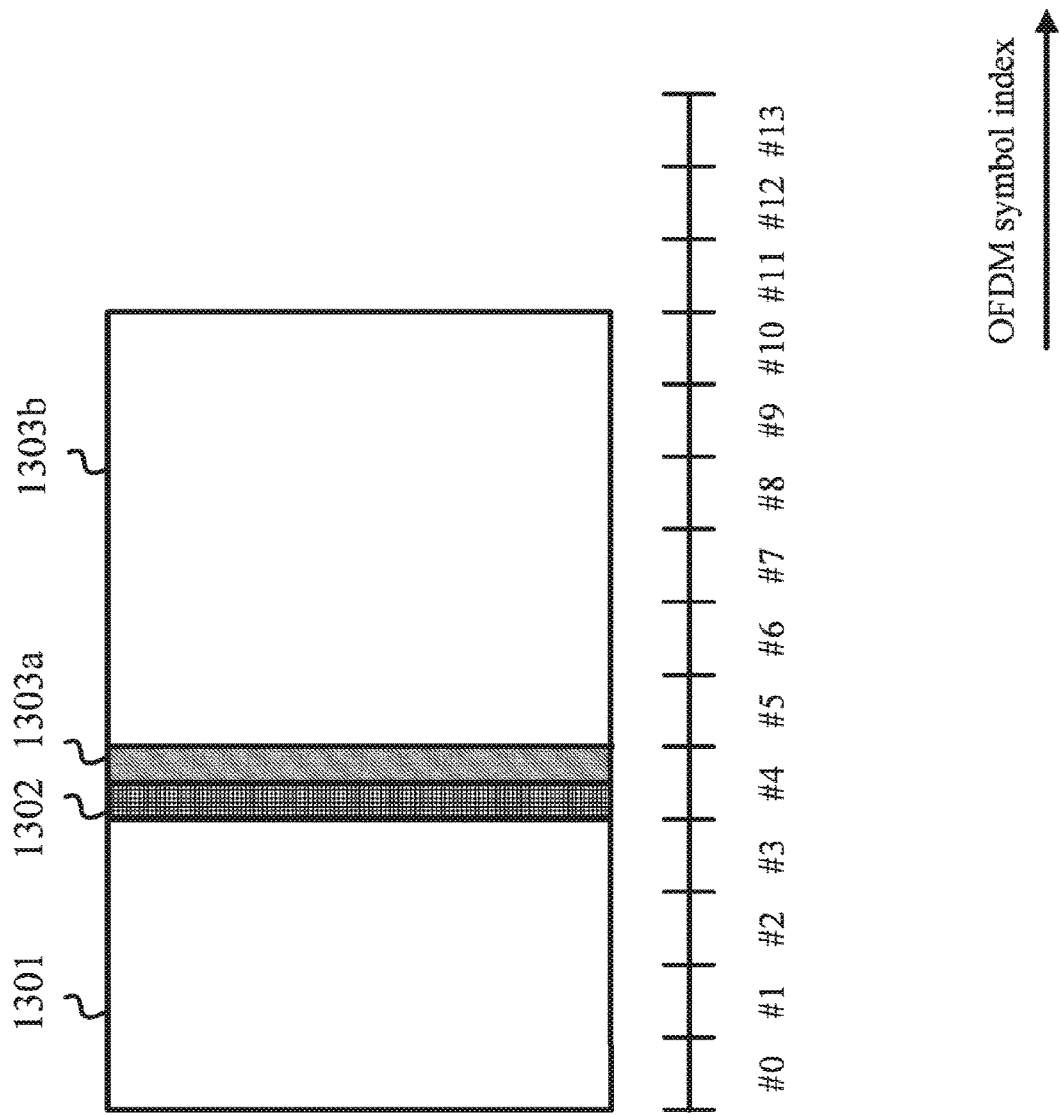
FIG. 13 is a diagram illustrating an example related to a configuration of a PUSCH according to an aspect of the present embodiment.

FIG. 13 is a diagram illustrating an example related to a configuration of the PUSCH according to an aspect of the present embodiment. In FIG. 13, the horizontal axis is a time axis, and indicates the OFDM symbol indices. In FIG. 13, 1301 is a physical signal, 1302 is a gap related to switch between the downlink and the uplink, and 1303*a* and 1303*b* are each a signal that configures the uplink physical channel. A certain uplink physical channel 1303 may at least include one or both of 1303*a* and 1303*b*. 1303*a* and 1303*b* may be mapped to the same slot. 1303*a* and 1303*b* need not be mapped to different slots. The terminal apparatus 1 may expect that 1303*a* and 1303*b* are mapped to the same slot. The terminal apparatus 1 need not expect that 1303*a* and 1303*b* are mapped to different slots. The base station apparatus 3 may map 1303*a* and 1303*b* to the same slot. The base station apparatus 3 need not map 1303*a* and 1303*b* to different slots.

The terminal apparatus 1 may perform the channel access procedure in 1302. The terminal apparatus 1 may transmit the uplink physical channel 1303, based on the channel access procedure performed in 1302. For example, in a case that the terminal apparatus 1 determines that a medium is idle as a result of the channel access procedure performed in 1302, the terminal apparatus 1 may transmit the uplink physical channel 1303. In a case that the terminal apparatus 1 determines that a medium is busy as a result of the channel access procedure performed in 1303, the terminal apparatus 1 need not transmit the uplink physical channel 1303.

For example, 1303*a* may include a part of the OFDM symbols. For example, 1303*a* may include such a signal that is not transmitted in at least a part of the OFDM symbols but is transmitted in a part other than the part. For example, 1303*a* may include such OFDM symbols in which a time domain signal is generated only in a part of the OFDM symbols.

The time domain signal of 1303*a* may be generated based at least on contents of the resource elements included in an OFDM symbol (for example, OFDM symbol #5 or the like) other than OFDM symbol #4. For example, the time domain signal of 1303*a* may be generated based at least on contents of the resource elements included in the following OFDM symbol (that is, OFDM symbol #5) of OFDM symbol #4.

The subcarrier index $k_x$ is hereinafter also referred to as a subcarrier index k. The OFDM symbol index $1_{sym}$ is also referred to as an OFDM symbol index 1. In other words, k may be used for indicating the subcarrier index, and l may be used for the OFDM symbol index.

A time domain signal si (t) of the uplink physical channel may be generated by Equation Equation 1

$$s_l(t) = \sum_{k=0}^{N_{grid,x}^{size,\mu} N_{SC}^{RB}-1} a_{k,l} \cdot \exp(j2\pi(k + k_0^\mu - N_{grid,x}^{size,\mu} N_{sc}^{RB}/2)\Delta f(t - N_{CP,l}^\mu T_c - t_{start,l}^\mu))$$

Equation 1

In Equation (1), t indicates time. Further, $a_{k,l}$ indicates contents of the resource elements identified by the subcarrier index k and the OFDM symbol index 1. Here, the contents may be, for example, one or multiple modulation symbols. The contents may be a complex value given based on one or multiple modulation symbols. In Equation (1), j indicates an imaginary unit. Further, π indicates a ratio of the circumference of a circle to its diameter. In a case that the CP configuration is the extended CP, $N^\mu_{CP,1}$ may be 512 κ·2$^{-\mu}$. In a case that the CP configuration is the normal CP, and l=0, $N^\mu_{CP,1}$ may be 144 κ·2$^{-\mu}$+16 κ. In a case that the CP configuration is the normal CP, and l=7.2·2μ, $N^\mu_{CP,1}$ may be 144 κ·2$^{-\mu}$+16 κ. In a case that the CP configuration is the normal CP, l≠0, and l≠7·2μ, $N^\mu_{CP,1}$ may be 144 κ·2$^{-\mu}$.

In Equation (1), $k^\mu_0$ may be given by Equation (2).

$$k^\mu_0 = (N^{start,\mu}_{grid,x} + N^{size,\mu}_{grid,x}/2)N^{RB}_{sc} - (N^{start,\mu 0}_{grid,x} + N^{size,\mu 0}_{grid,x}/2)N^{RB}_{sc} 2^{\mu_0 - \mu}$$ Equation 2

In Equation (2), μ$_0$ may be a maximum value in the subcarrier spacing configuration μ configured for the terminal apparatus 1.

In Equation (1), the domain of definition (or the range) of t may be given by Relationship (3).

$$t^\mu_{start,l} \le t \le t^\mu_{start,l} + (N^\mu_u + N^\mu_{CP,l})T_c$$ Relationship 3

In Relationship (3), in a case that l=0, $t^\mu_{start,l}$ may be 0. In a case that l≠0, $t^\mu_{start,l}$ may be $t^\mu_{start,l-1} + (N^\mu_u + N^\mu_{CP,l-1})T_c$. Further, $N^\mu_u$ may be 2048 κ2$^{-\mu}$.

The time domain signal of 1303*b* may be generated based on Equation (1). In other words, the time domain signal of a certain OFDM symbol included in 1303*b* may be given based at least on contents of the resource elements included in the certain OFDM symbol.

Regarding the time domain signal of 1303*a*, the time domain signal may be generated based on a method different from a generation method of the time domain signal of 1303*b*. For example, the time domain signal of a certain OFDM symbol included in 1303*a* may be given based at least on contents of the resource elements included in an OFDM symbol different from the certain OFDM symbol. For example, the time domain signal of a certain OFDM symbol included in 1303*a* may be given based at least on contents of the resource elements included in the following OFDM symbol of the certain OFDM symbol. The time domain signal of a certain OFDM symbol included in 1303*a* may be given based at least on contents of the resource elements included in a certain OFDM symbol included in 1303*b*. The time domain signal of a certain OFDM symbol included in 1303*a* may be given based at least on contents of the resource elements included in the first OFDM symbol included in 1303*b*.

The time domain signal of the OFDM symbol included in 1303*a* is also referred to as a floating CP. For example, a fact that the floating CP is applied to the time domain signal of a certain OFDM symbol may mean that the time domain signal of the certain OFDM symbol is given based at least on contents of the resource elements included in an OFDM symbol different from the certain OFDM symbol. A fact that the floating CP is applied to the time domain signal of a certain OFDM symbol may mean that the time domain signal of the certain OFDM symbol is given based at least on contents of the resource elements included in the following OFDM symbol of the certain OFDM symbol. A fact that the floating CP is applied to a certain OFDM symbol included in 1303*a* may mean that the time domain signal of the certain OFDM symbol is given based at least on contents of the resource elements included in a certain OFDM symbol included in 1303*b*.

For example, a fact that the floating CP is applied to a part of the time domain signal of a certain OFDM symbol may mean that the floating CP is applied to the part of the time domain signal of the certain OFDM symbol, and the time domain signal other than the part is not generated (or the time domain signal having power or amplitude of 0 is generated).

For example, a fact that the floating CP is applied to all of the time domain signals of a certain OFDM symbol may mean that the floating CP is applied to all of the time domain signals of the certain OFDM symbol.

For example, a fact that the floating CP is not applied to the time domain signal of a certain OFDM symbol may mean that the time domain signal of the certain OFDM symbol is given based at least on contents of the resource elements included in the certain OFDM symbol.

For example, a fact that the time domain signal of a certain OFDM symbol is not transmitted with the floating CP not being applied thereto may mean that the time domain signal of the certain OFDM symbol is not generated (or the time domain signal having power or amplitude of 0 is generated).

For example, a fact that the time domain signal of a certain OFDM symbol is transmitted with the floating CP not being applied thereto may mean that the time domain signal of the certain OFDM symbol is given based at least on contents of the resource elements included in the certain OFDM symbol.

For example, the time domain signal of the domain of definition of t expressed by Relationship (4) out of the time domain signal of the OFDM symbol of the OFDM symbol index 1 of 1303*a* may be generated based at least on Equation (5).

$$T^{tx}_{start} \le t \le t^\mu_{start,1} + (N^\mu_u + N^\mu_{CP,1})T_c$$ Relationship 4

$$s_l(t) = \sum_{k=0}^{N^{size,\mu}_{grid,x} N^{RB}_{SC} - 1} a_{k,l} \cdot \exp(j2\pi(k + k^\mu_0 - N^{size,\mu}_{grid,x} N^{RB}_{sc}/2)$$ Equation 5

$$\Delta f(t - N^\mu_{CP,l} - N^\mu_{CP,l+h} T_c - t^\mu_{start,h}))$$

In Relationship (4), $T^{tx}_{start}$ may be a value different from 0. $T^{tx}_{start}$ may be a value greater than 0. For example, $T^{tx}_{start}$ may be $N^{tx}_{start} \cdot T_c$. $N^{tx}_{start}$ may be a value different from 0. $N^{tx}_{start}$ may be a value greater than 0. The floating CP may be generated based at least on Relationship (4).

For example, $T^{tx}_{start}$ may be used for configuring the gap (for example, 1302 in FIG. 13) used for the channel access procedure performed prior to transmission of the uplink physical channel.

In Equation (5), h is an integer different from 0. For example, h may be 1. Further, h may be 2. For example, in a case that the subcarrier spacing configuration μ is 0 or 1, h may be 1. In a case that the subcarrier spacing configuration μ is 2, h may be 2. Further, h may be 1, regardless of the subcarrier spacing configuration μ.

In the following, description will be given by taking an example of a case that the uplink physical channel 1303 is configured as the PUCCH.

The PUCCH may include a first PUCCH format or a second PUCCH format. For example, the first PUCCH format may be used for transmitting one or both of the HARQ-ACK and the scheduling request bits of 2 bits or less. For example, the second PUCCH format may be used at least for transmitting the UCI of 3 bits or more of 3 bits or more. Here, the second PUCCH format need not be used for transmitting the HARQ-ACK and the scheduling request bits of 2 bits.

Figure 14:
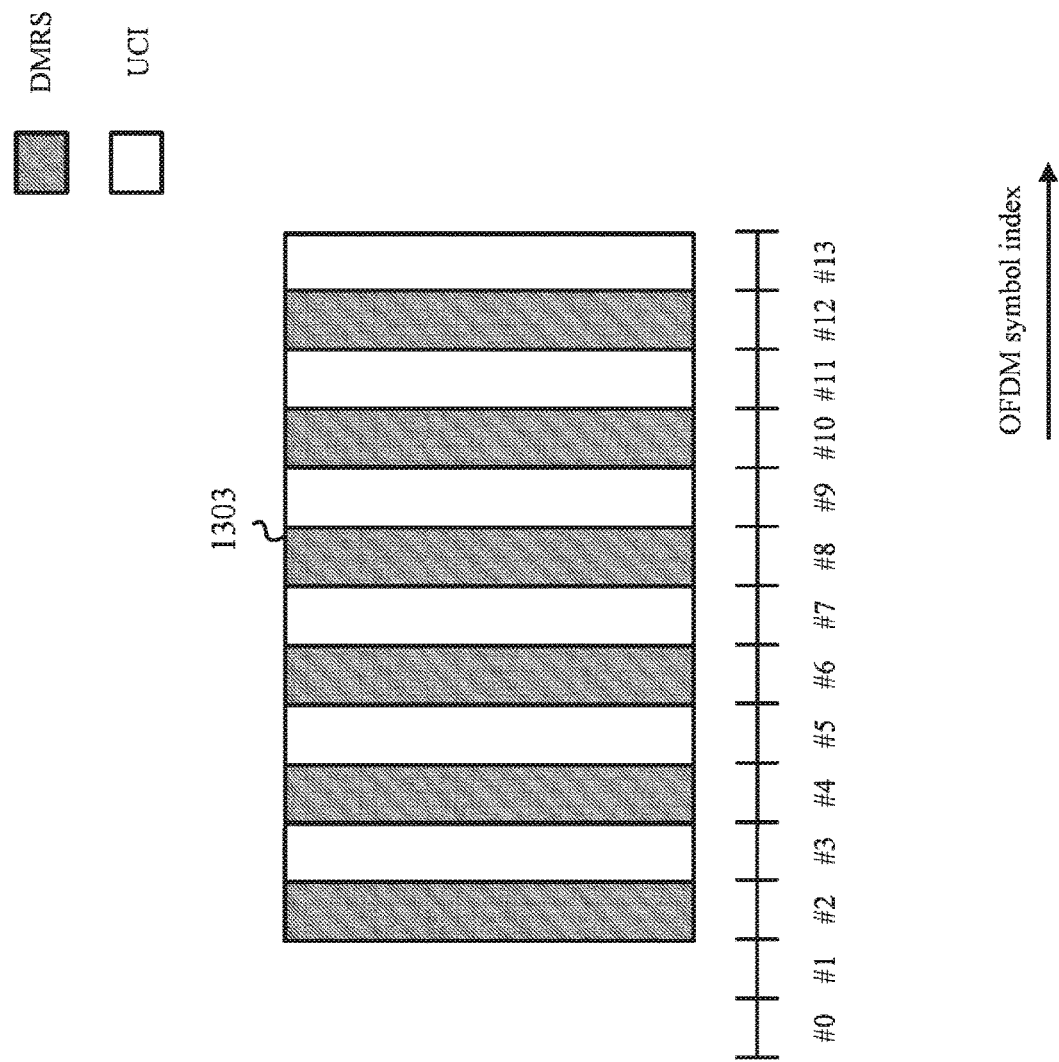
FIG. 14 is a diagram illustrating a configuration example of a first PUCCH format according to an aspect of the present embodiment.

FIG. 14 is a diagram illustrating a configuration example of the first PUCCH format according to an aspect of the present embodiment. The first PUCCH format is also referred to as PUCCH format 1. In FIG. 14, the horizontal axis indicates the OFDM symbol indices. Here, the starting OFDM symbol of the PUCCH (uplink physical channel 1303) is OFDM symbol #2, the ending OFDM symbol of the PUCCH is OFDM symbol #13, and the number (or length, period) of OFDM symbols of the PUCCH is 12. The DMRS of the PUCCH is mapped to even-numbered OFDM symbol indices with the starting OFDM symbol of the PUCCH being the 0-th OFDM symbol index. The modulation symbol of the UCI is mapped to the OFDM symbol indices to which the DMRS is not mapped in the PUCCH. As illustrated in FIG. 14, the PUCCH may be contiguously mapped from the starting OFDM symbol to the ending OFDM symbol.

For example, in a case that the starting OFDM symbol of the PUCCH configured by the first PUCCH format is the X-th OFDM symbol, the ending OFDM symbol of the PUCCH is the (X+L)-th OFDM symbol, and the floating CP is applied to the time domain signal of the X-th OFDM symbol, the DMRS of the PUCCH may be mapped to the OFDM symbols of even-numbered OFDM symbol indices with the (X+1)-th OFDM symbol being the 0-th OFDM symbol index.

For example, in a case that the starting OFDM symbol of the PUCCH configured by the first PUCCH format is the X-th OFDM symbol, the ending OFDM symbol of the PUCCH is the (X+L)-th OFDM symbol, and the floating CP is not applied to the time domain signal of the X-th OFDM symbol, the DMRS of the PUCCH may be mapped to the OFDM symbols of even-numbered OFDM symbol indices with the X-th OFDM symbol being the 0-th OFDM symbol index.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the floating CP is applied to a part of the time domain signal of the X-th OFDM symbol, the DMRS of the PUCCH may be mapped to the OFDM symbols of even-numbered OFDM symbol indices with the (X+1)-th OFDM symbol being the 0-th OFDM symbol index.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the floating CP is applied to all of the time domain signals of the X-th OFDM symbol, the DMRS of the PUCCH may be mapped to the OFDM symbols of even-numbered OFDM symbol indices with the (X+1)-th OFDM symbol being the 0-th OFDM symbol index.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the time domain signal of the X-th OFDM symbol is not transmitted with the floating CP not being applied thereto, the DMRS of the PUCCH may be mapped to the OFDM symbols of even-numbered OFDM symbol indices with the (X+1)-th OFDM symbol being the 0-th OFDM symbol index.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the time domain signal of the X-th OFDM symbol is transmitted with the floating CP not being applied thereto, the DMRS of the PUCCH may be mapped to the OFDM symbols of even-numbered OFDM symbol indices with the X-th OFDM symbol being the 0-th OFDM symbol index.

For example, in a case that the starting OFDM symbol (X-th OFDM symbol) of the PUCCH configured by the first PUCCH format is given by the RRC parameter, and a fact that the number of OFDM symbols of the PUCCH is L is given by the RRC parameter, the DMRS of the PUCCH may be mapped to the OFDM symbols of even-numbered OFDM symbol indices with the X-th OFDM symbol being the 0-th OFDM symbol index, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the floating CP is applied to a part of the time domain signal of the (X−1)-th OFDM symbol, the DMRS of the PUCCH may be mapped to the OFDM symbols of even-numbered OFDM symbol indices with the X-th OFDM symbol being the 0-th OFDM symbol index. Here, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the floating CP is applied to all of the time domain signals of the (X−1)-th OFDM symbol, the DMRS of the PUCCH may be mapped to the OFDM symbols of even-numbered OFDM symbol indices with the X-th OFDM symbol being the 0-th OFDM symbol index. Here, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the time domain signal of the (X−1)-th OFDM symbol is not transmitted with the floating CP not being applied thereto, the DMRS of the PUCCH may be mapped to the OFDM symbols of even-numbered OFDM symbol indices with the X-th OFDM symbol being the 0-th OFDM symbol index.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the time domain signal of the (X−1)-th OFDM symbol is transmitted with the floating CP not being applied thereto, the DMRS of the PUCCH may be mapped to the OFDM symbols of even-numbered OFDM symbol indices with the (X−1)-th OFDM symbol being the 0-th OFDM symbol index.

Figure 15:
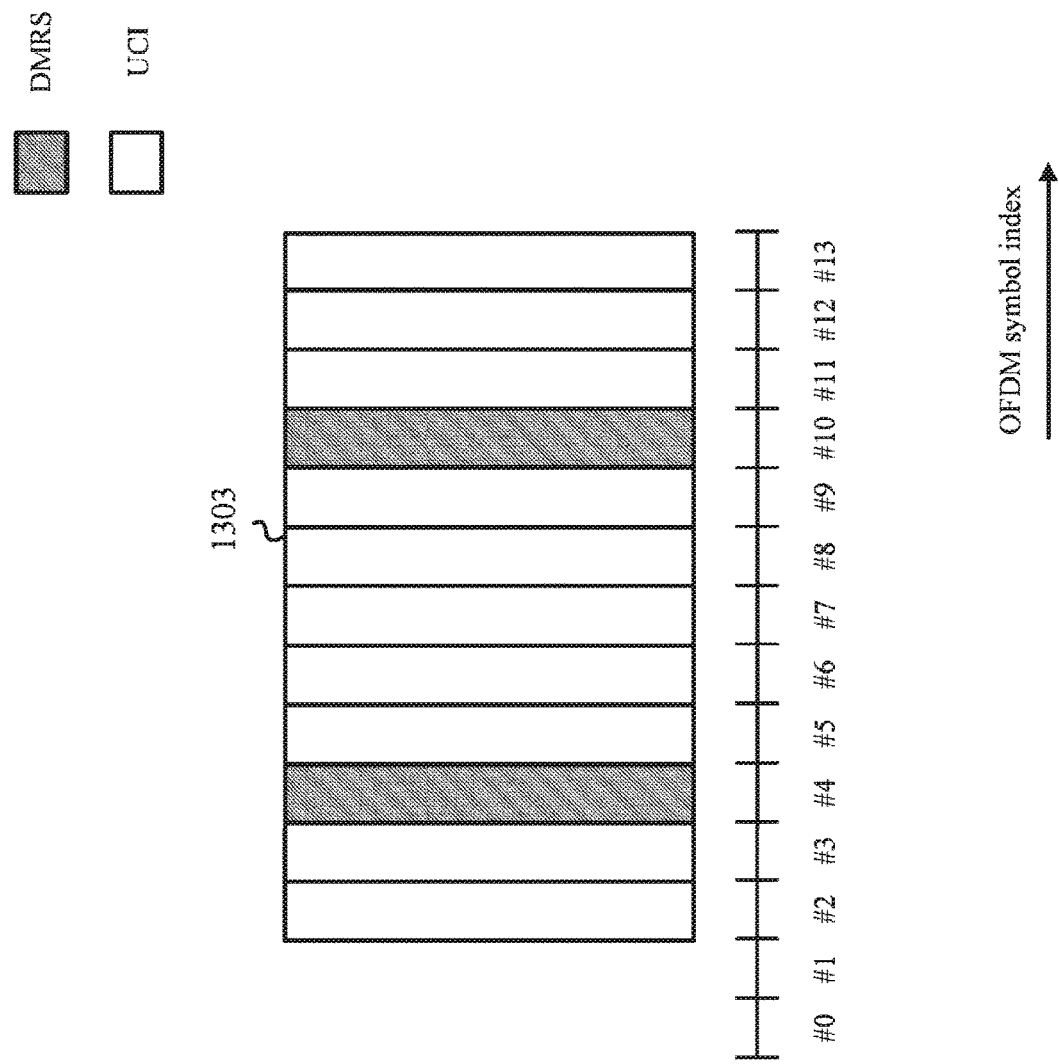
FIG. 15 is a diagram illustrating a configuration example of a second PUCCH format according to an aspect of the present embodiment.

FIG. 15 is a diagram illustrating a configuration example of the second PUCCH format according to an aspect of the present embodiment. The second PUCCH format is also referred to as PUCCH format 3. In FIG. 15, the horizontal axis indicates the OFDM symbol indices. Here, the starting OFDM symbol of the PUCCH (uplink physical channel 1303) is OFDM symbol #2, the ending OFDM symbol of the PUCCH is OFDM symbol #13, and the number (or length, period) of OFDM symbols of the PUCCH is 12. The DMRS of the PUCCH is mapped to the second and eighth OFDM symbol indices with the starting OFDM symbol of the PUCCH being the 0-th OFDM symbol index. The modulation symbol of the UCI is mapped to the OFDM symbol indices to which the DMRS is not mapped in the PUCCH. As illustrated in FIG. 15, the PUCCH may be contiguously mapped from the starting OFDM symbol to the ending OFDM symbol.

The DMRS of the PUCCH configured by the second PUCCH format may be mapped to the OFDM symbols included in a prescribed set of OFDM symbols. The prescribed set of OFDM symbols may be given based at least on the number of OFDM symbols of the PUCCH. For example, in a case that the number of OFDM symbols of the PUCCH is 5, the prescribed set of OFDM symbols may include the zeroth and third OFDM symbols. In a case that the number of OFDM symbols of the PUCCH is 8, the prescribed set of OFDM symbols may include the first and fifth OFDM symbols. In a case that the number of OFDM symbols of the PUCCH is 10, the prescribed set of OFDM symbols may include the second and seventh OFDM symbols. In a case that the number of OFDM symbols of the PUCCH is 14, the prescribed set of OFDM symbols may include the third and tenth OFDM symbols.

For example, in a case that the starting OFDM symbol of the PUCCH configured by the second PUCCH format is the X-th OFDM symbol, the ending OFDM symbol of the PUCCH is the (X+L)-th OFDM symbol, and the floating CP is applied to the time domain signal of the X-th OFDM symbol, the DMRS of the PUCCH may be mapped to the OFDM symbols included in a prescribed set of OFDM symbols with the (X+1)-th OFDM symbol being the 0-th OFDM symbol index. The prescribed set of OFDM symbols may be given based at least on an assumption that the number of OFDM symbols of the PUCCH is L.

For example, in a case that the starting OFDM symbol of the PUCCH configured by the second PUCCH format is the X-th OFDM symbol, the ending OFDM symbol of the PUCCH is the (X+L)-th OFDM symbol, and the floating CP is not applied to the time domain signal of the X-th OFDM symbol, the DMRS of the PUCCH may be mapped to the OFDM symbols included in a prescribed set of OFDM symbols with the X-th OFDM symbol being the 0-th OFDM symbol index. The prescribed set of OFDM symbols may be given based at least on an assumption that the number of OFDM symbols of the PUCCH is L+1.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the floating CP is applied to a part of the time domain signal of the X-th OFDM symbol, the DMRS of the PUCCH may be mapped to the OFDM symbols included in a prescribed set of OFDM symbols with the (X+1)-th OFDM symbol being the 0-th OFDM symbol index. The prescribed set of OFDM symbols may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the floating CP is applied to all of the time domain signals of the X-th OFDM symbol, the DMRS of the PUCCH may be mapped to the OFDM symbols included in a prescribed set of OFDM symbols with the (X+1)-th OFDM symbol being the 0-th OFDM symbol index. The prescribed set of OFDM symbols may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the time domain signal of the X-th OFDM symbol is not transmitted with the floating CP not being applied thereto, the DMRS of the PUCCH may be mapped to the OFDM symbols included in a prescribed set of OFDM symbols with the (X+1)-th OFDM symbol being the 0-th OFDM symbol index. The prescribed set of OFDM symbols may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the time domain signal of the X-th OFDM symbol is transmitted with the floating CP not being applied thereto, the DMRS of the PUCCH may be mapped to the OFDM symbols included in a prescribed set of OFDM symbols with the X-th OFDM symbol being the 0-th OFDM symbol index. The prescribed set of OFDM symbols may be given based at least on an assumption that the number of OFDM symbols of the PUCCH is L+1.

For example, in a case that the starting OFDM symbol (X-th OFDM symbol) of the PUCCH configured by the second PUCCH format is given by the RRC parameter, and a fact that the number of OFDM symbols of the PUCCH is L is given by the RRC parameter, the DMRS of the PUCCH may be mapped to the OFDM symbols included in a prescribed set of OFDM symbols with the X-th OFDM symbol being the 0-th OFDM symbol index, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUCCH may be the (X−1)-th OFDM symbol. The prescribed set of OFDM symbols may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the floating CP is applied to a part of the time domain signal of the (X−1)-th OFDM symbol, the DMRS of the PUCCH may be mapped to the OFDM symbols included in a prescribed set of OFDM symbols with the X-th OFDM symbol being the 0-th OFDM symbol index. Here, the actual starting OFDM symbol of the PUCCH may be the (X−1)-th OFDM symbol. The prescribed set of OFDM symbols may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the floating CP is applied to all of the time domain signals of the (X−1)-th OFDM symbol, the DMRS of the PUCCH may be mapped to the OFDM symbols included in a prescribed set of OFDM symbols with the X-th OFDM symbol being the 0-th OFDM symbol index. Here, the actual starting OFDM symbol of the PUCCH may be the (X−1)-th OFDM symbol. The prescribed set of OFDM symbols may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the time domain signal of the (X−1)-th OFDM symbol is not transmitted with the floating CP not being applied thereto, the DMRS of the PUCCH may be mapped to the OFDM symbols included in a prescribed set of OFDM symbols with the X-th OFDM symbol being the 0-th OFDM symbol index. The prescribed set of OFDM symbols may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the time domain signal of the (X−1)-th OFDM symbol is transmitted with the floating CP not being applied thereto, the DMRS of the PUCCH may be mapped to the OFDM symbols included in a prescribed set of OFDM symbols with the (X−1)-th OFDM symbol being the 0-th OFDM symbol index. The prescribed set of OFDM symbols may be given based at least on an assumption that the number of OFDM symbols of the PUCCH is L+1.

In the first PUCCH format, a complex modulation symbol d(0) may be generated with Binary Phase Shift Keying (BPSK) or Quadrature Phase Shift Keying (QPSK) modulation of a block b (0), . . . , b ($M_{bit}$−1) of bits. A sequence y(n) of complex modulation symbols may be generated based at least on the modulation symbols and Equation (6).

$$y(n)=d(0) \cdot r(n) \quad \text{Equation 6}$$

In Equation (6), r(n) indicates the n-th element of a certain sequence. Here, the certain sequence may be a low-PAPR sequence. Here, a Peak-to-Average Power Ratio (PAPR) is a term indicating a ratio between peak power (or maximum power) and average power of a certain signal. For example, the low-PAPR sequence may be a sequence that has autocorrelation of 0. The low-PAPR sequence may be a sequence that has autocorrelation of 0 and that gives a signal of low amplitude. The low-PAPR sequence may be given by a Zadoff-Chu (ZC) sequence. In Equation (6), the domain of definition of n may be an integer from 0 to $N^{RB}_{sc}$−1.

y(n) may be subjected to block-wise spread, based on a spreading sequence w(m). A sequence z after being spread may be generated based at least on Equation (7).

$$z(m'N^{RB}_{sc}N^{PUCCH}_{SF,0}+mN^{RB}_{sc}+n)=w(m) \cdot y(n) \quad \text{Equation 7}$$

In Equation (7), m' is an index associated with frequency hopping. Further, $N^{PUCCH}_{SF,0}$ indicates an index associated with a spreading factor of the spreading sequence w(m) for frequency hop #0. The spreading factor of the spreading sequence w(m) may correspond to the length of the sequence of the spreading sequence w(m). w(m) may be generated based at least on Equation (8). In a case that intra-slot frequency hopping is not applied to the PUCCH, the PUCCH may be configured with frequency hop #0. The intra-slot frequency hopping may be frequency hopping in a slot in which a certain uplink physical channel is present.

$$w(m)=\exp(j2\pi\phi(m)/N^{PUCCH}_{SF,m'}) \quad \text{Equation 8}$$

In Equation (8), j indicates an imaginary unit. Further, π indicates a ratio of the circumference of a circle to its diameter. φ(m) is a sequence. $N^{PUCCH}_{SF,m'}$ indicates an index related to the spreading factor of the spreading sequence w(m) for frequency hop #m'. The sequence length of φ(m) may correspond to the Spreading factor of an Orthogonal Cover Code (OCC) applied to the modulation symbol of the UCI. The sequence length of φ(m) may be given based at least on the value of $N^{PUCCH}_{SF,m'}$. In other words, the sequence length of φ(m) may be given for each frequency hop. The value of $N^{PUCCH}_{SF,m'}$ may be given based at least on the number of OFDM symbols of the PUCCH.

For example, in a case that the number of OFDM symbols of the PUCCH is 14 and the frequency hopping is not applied, the value of $N^{PUCCH}_{SF,0}$ may be 7. In a case that the number of OFDM symbols of the PUCCH is 12 and the frequency hopping is not applied, the value of $N^{PUCCH}_{SF,0}$ may be 6. In a case that the number of OFDM symbols of the PUCCH is 14 and the frequency hopping is applied, the value of $N^{PUCCH}_{SF,0}$ may be 3, and the value of $N^{PUCCH}_{SF,1}$ may be 4.

For example, in a case that the starting OFDM symbol of the PUCCH configured by the first PUCCH format is the X-th OFDM symbol, the ending OFDM symbol of the PUCCH is the (X+L)-th OFDM symbol, and the floating CP is applied to the time domain signal of the X-th OFDM symbol, the index $N^{PUCCH}_{SF,m'}$ associated with the spreading factor of the OCC applied to the modulation symbol of the UCI included in the PUCCH may be given based at least on an assumption that the number of OFDM symbols of the PUCCH is L.

For example, in a case that the starting OFDM symbol of the PUCCH configured by the first PUCCH format is the X-th OFDM symbol, the ending OFDM symbol of the PUCCH is the (X+L)-th OFDM symbol, and the floating CP is not applied to the time domain signal of the X-th OFDM symbol, the index $N^{PUCCH}_{SF,m'}$ associated with the spreading factor of the OCC applied to the modulation symbol of the UCI included in the PUCCH may be given based at least on an assumption that the number of OFDM symbols of the PUCCH is L+1.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the floating CP is applied to a part of the time domain signal of the X-th OFDM symbol, the index $N^{PUCCH}_{SF,m'}$ associated with the spreading factor of the OCC applied to the modulation symbol of the UCI included in the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the floating CP is applied to all of the time domain signals of the X-th OFDM symbol, the index $N^{PUCCH}_{SF,m'}$ associated with the spreading factor of the OCC applied to the modulation symbol of the UCI included in the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the time domain signal of the X-th OFDM symbol is not transmitted with the floating CP not being applied thereto, the index $N^{PUCCH}{}_{SF,m'}$ associated with the spreading factor of the OCC applied to the modulation symbol of the UCI included in the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the time domain signal of the X-th OFDM symbol is transmitted with the floating CP not being applied thereto, the index $N^{PUCCH}{}_{SF,m'}$ associated with the spreading factor of the OCC applied to the modulation symbol of the UCI included in the PUCCH may be given based at least on an assumption that the number of OFDM symbols of the PUCCH is L+1.

For example, in a case that the starting OFDM symbol (X-th OFDM symbol) of the PUCCH configured by the first PUCCH format is given by the RRC parameter, and a fact that the number of OFDM symbols of the PUCCH is L is given by the RRC parameter, the index $N^{PUCCH}{}_{SF,m'}$ associated with the spreading factor of the OCC applied to the modulation symbol of the UCI included in the PUCCH may be given based at least on an assumption that the number of OFDM symbols of the PUCCH is L, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the floating CP is applied to a part of the time domain signal of the (X−1)-th OFDM symbol, the index $N^{PUCCH}{}_{SF,m'}$ associated with the spreading factor of the OCC applied to the modulation symbol of the UCI included in the PUCCH may be given based at least on an assumption that the number of OFDM symbols of the PUCCH is L. Here, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the floating CP is applied to all of the time domain signals of the (X−1)-th OFDM symbol, the index $N^{PUCCH}$SF, m, associated with the spreading factor of the OCC applied to the modulation symbol of the UCI included in the PUCCH may be given based at least on an assumption that the number of OFDM symbols of the PUCCH is L. Here, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the time domain signal of the (X−1)-th OFDM symbol is not transmitted with the floating CP not being applied thereto, the index $N^{PUCCH}{}_{SF,m'}$ associated with the spreading factor of the OCC applied to the modulation symbol of the UCI included in the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the time domain signal of the (X−1)-th OFDM symbol is transmitted with the floating CP not being applied thereto, the index $N^{PUCCH}{}_{SF,m'}$ associated with the spreading factor of the OCC applied to the modulation symbol of the UCI included in the PUCCH may be given based at least on an assumption that the number of OFDM symbols of the PUCCH is L+1.

The terminal apparatus 1 may determine transmission power $P_{PUCCH, b,f,c}(i,q_u, q_d, 1)$ of the PUCCH, based at least on Equation (9). The terminal apparatus 1 may determine the transmission power $P_{PUCCH, b,f,c}(i,q_u, q_d, 1)$ of the PUCCH, based at least on a part or all of various parameters on the right-hand side shown in Equation (9). The transmission power $P_{PUCCH,b,f,c}(i,q_u, q_d, 1)$ of the PUCCH determined by the terminal apparatus 1 indicates a transmission power value of the PUCCH transmitted in uplink BWP #b in carrier #f in primary cell #c.

$$P_{PUCCH,b,f,c}(i,q_u,q_d,1)=\min(P_{CMAX,f,c}(i), P_{O\_PUCCH,b,f,c}(q_u)+10\log_{10}(2^\mu \cdot M^{PUCCH}{}_{RB,b,f,c}(i))+PL_{b,f,c}(q_d)+\Delta_{F\_PUCCH}(F)+\tau_{TF,b,f,c}(i)+g_{b,f,c}(i,l))$$ Equation 9

In Equation (9), i is an index indicating a transmission occasion of the PUCCH. Here, the transmission occasion of the PUCCH may be defined based at least on the index of the starting OFDM symbol to which the PUCCH is mapped, and the number of OFDM symbols of the PUCCH. In other words, an index i indicating the transmission occasion of the PUCCH is associated with the position of the PUCCH in the time domain. In Equation (9), 1 is an index associated with adjustment of the transmission power of the PUCCH.

In Equation (9), Pc r c (i) indicates maximum output power (UE configured maximum output power) configured for the terminal apparatus 1 in carrier #f of the serving cell C.

In Equation (9), $P_{O\_PUCCH,b,f,c}(q_u)$ may be a transmission power parameter corresponding to index $q_u$. $P_{O\_PUCCH,b,f,c}(q_u)$ is also referred to as target transmission power or the like. $P_{O\_PUCCH,b,f,c}(q_u)$ may be given by the RRC parameter.

In Equation (9), $M^{PUCCH}{}_{RB,b,f,c}(i)$ indicates the number of resource blocks of the PUCCH transmitted in uplink BWP #b of carrier #f of serving cell #c.

In Equation (9), $PL_{b,f,c}(q_d)$ indicates a value given based on Path loss measured by a downlink physical signal of index $q_d$.

In Equation (9), $\Delta_{F\_PUCCH}(F)$ is a value configured for each PUCCH format.

In Equation (9), $\Delta_{TF,b,f,c}(i)$ for the first PUCCH format is a parameter given based at least on Equation (10). In other words, the terminal apparatus 1 may determine the value of $\Delta_{TF,b,f,c}(i)$ for the first PUCCH format, based at least on Equation (10).

$$\Delta_{TF,b,f,c}(i) = 10\log_{10}\left(\frac{N_{ref}^{PUCCH}}{N_{symb}^{PUCCH}(i)}\right) + \Delta_{UCI}(i)$$ Equation 10

In Equation (10), for the first PUCCH format, $N^{PUCCH}_{ref}$ is $N^{slot}_{symb}$. Further, $N^{PUCCH}_{symb}(i)$ may be the number of OFDM symbols of the PUCCH configured by the RRC parameter.

In Equation (10), $\Delta_{UCI}(i)$ is given by $10 \cdot \log_{10} (O_{UCI}(i))$. $O_{UCI}(i)$ indicates the number of bits of the UCI included in the PUCCH corresponding to the transmission occasion of index i.

For example, in a case that the starting OFDM symbol of the PUCCH configured by the first PUCCH format is the X-th OFDM symbol, the ending OFDM symbol of the PUCCH is the (X+L)-th OFDM symbol, and the floating CP is applied to the time domain signal of the X-th OFDM symbol, the value $N^{PUCCH}_{symb}(i)$ used for determination of the transmission power of the PUCCH may be given based at least on an assumption that the number of OFDM symbols of the PUCCH is L.

For example, in a case that the starting OFDM symbol of the PUCCH configured by the first PUCCH format is the X-th OFDM symbol, the ending OFDM symbol of the PUCCH is the (X+L)-th OFDM symbol, and the floating CP is not applied to the time domain signal of the X-th OFDM symbol, the value $N^{PUCCH}_{symb}(i)$ used for determination of the transmission power of the PUCCH may be given based at least on an assumption that the number of OFDM symbols of the PUCCH is L+1.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the floating CP is applied to a part of the time domain signal of the X-th OFDM symbol, the value $N^{PUCCH}_{symb}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the floating CP is applied to all of the time domain signals of the X-th OFDM symbol, the value $N^{PUCCH}_{symb}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the time domain signal of the X-th OFDM symbol is not transmitted with the floating CP not being applied thereto, the value $N^{PUCCH}_{symb}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L+1 is given by the RRC parameter, and the time domain signal of the X-th OFDM symbol is transmitted with the floating CP not being applied thereto, the value $N^{PUCCH}_{symb}(i)$ used for determination of the transmission power of the PUCCH may be given based at least on an assumption that the number of OFDM symbols of the PUCCH is L+1.

For example, in a case that the starting OFDM symbol (X-th OFDM symbol) of the PUCCH configured by the first PUCCH format is given by the RRC parameter, and a fact that the number of OFDM symbols of the PUCCH is L is given by the RRC parameter, the value $N^{PUCCH}_{symb}(i)$ used for determination of the transmission power of the PUCCH may be given based at least on an assumption that the number of OFDM symbols of the PUCCH is L, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the floating CP is applied to a part of the time domain signal of the (X−1)-th OFDM symbol, the value $N^{PUCCH}_{symb}(i)$ used for determination of the transmission power of the PUCCH may be given based at least on an assumption that the number of OFDM symbols of the PUCCH is L. Here, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the floating CP is applied to all of the time domain signals of the (X−1)-th OFDM symbol, the value $N^{PUCCH}_{symb}(i)$ used for determination of the transmission power of the PUCCH may be given based at least on an assumption that the number of OFDM symbols of the PUCCH is L. Here, the actual starting OFDM symbol of the PUCCH may be the (X−1)-th OFDM symbol.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the time domain signal of the (X−1)-th OFDM symbol is not transmitted with the floating CP not being applied thereto, the value $N^{PUCCH}_{symb}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the first PUCCH format is given by the RRC parameter, a fact that the number of OFDM symbols of the PUCCH is L is given by the RRC parameter, and the time domain signal of the (X−1)-th OFDM symbol is transmitted with the floating CP not being applied thereto, the value $N^{PUCCH}_{symb}(i)$ used for determination of the transmission power of the PUCCH may be given based at least on an assumption that the number of OFDM symbols of the PUCCH is L+1.

In a case that the number of bits of the UCI corresponding to the transmission occasion of index i is 11 or less, in Equation (9), $\Delta_{TF,b,f,c}(i)$ for the second PUCCH format is a parameter given based at least on Equation (11). In other words, the terminal apparatus 1 may determine the value of $\Delta_{TF,b,f,c}(i)$ for the second PUCCH format, based at least on Equation (11).

$$\Delta_{TF,b,f,c}(i) = 10 \log_{10}(K_1 \cdot (n_{HARQ\text{-}ACK}(i) + O_{SR}(i) + O_{CSI}(i))/N_{RE}(i)) \quad \text{Equation 11}$$

In Equation (11), $K_1$ is 6. Further, $n_{HARQ\text{-}ACK}(i)$ is a value associated with the HARQ-ACK codebook transmitted on the PUCCH corresponding to the transmission occasion of index i. Here, the value associated with the HARQ-ACK codebook transmitted on the PUCCH corresponding to the transmission occasion of index i may be the number of bits included in the HARQ-ACK codebook. $O_{SR}(i)$ is the number of bits of the SR transmitted on the PUCCH corresponding to the transmission occasion of index i. $O_{CSI}(i)$ is the number of bits of the CSI transmitted on the PUCCH corresponding to the transmission occasion of index i.

In Equation (11), $N_{RE}(i)$ is given by $M^{PUCCH}_{RB,b,f,c}(i) \cdot N^{RB}_{sc,ctrl}(i) \cdot N^{PUCCH}_{symb,UCI,b,f,c}(i)$. Here, $N^{RB}_{sc,ctrl}(i)$ is 12. $N^{PUCCH}_{symb,UCI,b,f,c}(i)$ is the number of OFDM symbols of the PUCCH used for transmission of the UCI. Here, the number of OFDM symbols of the PUCCH used for transmission of the UCI may be a value obtained by subtracting the number of OFDM symbols used for the DMRS of the PUCCH from the number of OFDM symbols of the PUCCH.

In a case that the number of bits of the UCI corresponding to the transmission occasion of index i is 12 or more, in Equation (9), $\Delta_{TF,b,f,c}(i)$ for the second PUCCH format is a parameter given based at least on Equation (12). In other words, the terminal apparatus 1 may determine the value of $\Delta_{TF,b,f,c}(i)$ for the second PUCCH format, based at least on Equation (12).

$$\Delta_{TF,b,f,c}(i) = 10 \log_{10}(2^{K_2 \cdot BPRE(i)} - 1) \qquad \text{Equation 12}$$

In Equation (11), $K_2$ is 2.4. BPRE (i) is given by $(O_{ACK}(i) + O_{SR}(i) + O_{CSI}(i) + O_{CRC}(i))/N_{RE}(i)$. BRPE(i) indicates a Bit Per Resource Element (BPRE) of the PUCCH corresponding to the transmission occasion of index i. Here, $O_{ACK}(i)$ is the number of bits of the HARQ-ACK transmitted on the PUCCH corresponding to the transmission occasion of index i. $O_{SR}(i)$ is the number of bits of the SR transmitted on the PUCCH corresponding to the transmission occasion of index i. $O_{CSI}(i)$ is the number of bits of the CSI transmitted on the PUCCH corresponding to the transmission occasion of index i. $O_{CRC}(i)$ is the number of bits of the CRC transmitted or assumed on the PUCCH corresponding to the transmission occasion of index i. The number of bits of the CRC assumed may be the same as or may be different from the number of bits of the CRC transmitted.

In Equation (12), $N_{RE}(i)$ is given by $M^{PUCCH}_{RB,b,f,c}(i) \cdot N^{RB}_{sc,ctrl}(i) \cdot N^{PUCCH}_{symb,UCI,b,f,c}(i)$. Here, $N^{RB}_{sc,ctrl}(i)$ is 12. $N^{PUCCH}_{symb,UCI,b,f,c}(i)$ is the number of OFDM symbols of the PUCCH used for transmission of the UCI. Here, the number of OFDM symbols of the PUCCH used for transmission of the UCI may be a value obtained by subtracting the number of OFDM symbols used for the DMRS of the PUCCH from the number of OFDM symbols of the PUCCH.

For example, in a case that the starting OFDM symbol of the PUCCH configured by the second PUCCH format is the X-th OFDM symbol, the ending OFDM symbol of the PUCCH is the (X+L)-th OFDM symbol, and the floating CP is applied to the time domain signal of the X-th OFDM symbol, the value $N^{PUCCH}_{symb,UCI,b,f,c}(i)$ used for determination of the transmission power of the PUCCH may be given based at least on an assumption that the number of OFDM symbols of the PUCCH is L.

For example, in a case that the starting OFDM symbol of the PUCCH configured by the second PUCCH format is the X-th OFDM symbol, the ending OFDM symbol of the PUCCH is the (X+L)-th OFDM symbol, and the floating CP is not applied to the time domain signal of the X-th OFDM symbol, the value $N^{PUCCH}_{symb,UCI,b,f,c}(i)$ used for determination of the transmission power of the PUCCH may be given based at least on an assumption that the number of OFDM symbols of the PUCCH is L+1.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the floating CP is applied to a part of the time domain signal of the X-th OFDM symbol, the value $N^{PUCCH}_{symb,UCI,b,f,c}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the floating CP is applied to all of the time domain signals of the X-th OFDM symbol, the value $N^{PUCCH}_{symb,UCI,b,f,c}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the time domain signal of the X-th OFDM symbol is not transmitted with the floating CP not being applied thereto, the value $N^{PUCCH}_{symb,UCI,b,f,c}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the time domain signal of the X-th OFDM symbol is transmitted with the floating CP not being applied thereto, the value $N^{PUCCH}_{symb,UCI,b,f,c}(i)$ used for determination of the transmission power of the PUCCH may be given based at least on an assumption that the number of OFDM symbols of the PUCCH is L+1.

For example, in a case that the starting OFDM symbol (X-th OFDM symbol) of the PUCCH configured by the second PUCCH format is given by the RRC parameter, and a fact that the number of OFDM symbols of the PUCCH is L is given by the RRC parameter, the value $N^{PUCCH}_{symb,UCI,b,f,c}(i)$ used for determination of the transmission power of the PUCCH may be given based at least on an assumption that the number of OFDM symbols of the PUCCH is L, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUCCH may be the (X−1)-th OFDM symbol.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the floating CP is applied to a part of the time domain signal of the (X−1)-th OFDM symbol, the value $N^{PUCCH}_{symb,UCI,b,f,c}(i)$ used for determination of the transmission power of the PUCCH may be given based at least on an assumption that the number of OFDM symbols of the PUCCH is L. Here, the actual starting OFDM symbol of the PUCCH may be the (X−1)-th OFDM symbol.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the floating CP is applied to all of the time domain signals of the (X−1)-th OFDM symbol, the value $N^{PUCCH}_{symb,UCI,b,f,c}(i)$ used for determination of the transmission power of the PUCCH may be given based at least on an assumption that the number of OFDM symbols of the PUCCH is L. Here, the actual starting OFDM symbol of the PUCCH may be the (X−1)-th OFDM symbol.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the time domain signal of the (X−1)-th OFDM symbol is not transmitted with the floating CP not being applied thereto, the value $N^{PUCCH}_{symb,UCI,b,f,c}(i)$ used for determination of the transmission power of the PUCCH may be given based at least on an assumption that the number of OFDM symbols of the PUCCH is L.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the time domain signal of the (X−1)-th OFDM symbol is transmitted with the floating CP not being applied thereto, the value $N^{PUCCH}_{symb,UCI,b,f,c}(i)$ used for determination of the transmission power of the PUCCH may be given based at least on an assumption that the number of OFDM symbols of the PUCCH is L+1.

In Equation (9), $g_{b,f,c}(i,1)$ indicates a transmission power control value (TPC command) indicated by the DCI format.

In the second PUCCH format, the number $E_{tot}$ of coding bits of the UCI may be given by $24 \cdot N^{PUCCH,3}_{symb,UCI} \cdot N^{PUCCH,3}_{PRB}$. Here, $N^{PUCCH,3}_{symb,UCI}$ is the number of OFDM symbols used at least for carrying the UCI. Here, $N^{PUCCH,3}_{symb,UCI}$ may be given by a difference obtained by subtracting the number of OFDM symbols used for the DMRS of the PUCCH from the number of OFDM symbols of the PUCCH. $N^{PUCCH,3}_{PRB}$ is the number of resource blocks of the PUCCH. The number of coding bits of the UCI is also referred to as a rate matching output sequence length.

For example, in a case that the starting OFDM symbol of the PUCCH configured by the second PUCCH format is the X-th OFDM symbol, the ending OFDM symbol of the PUCCH is the (X+L)-th OFDM symbol, and the floating CP is applied to the time domain signal of the X-th OFDM symbol, the number $E_{tot}$ of coding bits of the UCI included in the PUCCH may be given based at least on an assumption that the number of OFDM symbols of the PUCCH is L in determination of the number $N^{PUCCH,3}_{symb,UCI}$ of OFDM symbols used at least for carrying the UCI.

In determination of the number $N^{PUCCH,3}_{symb,UCI}$ of OFDM symbols used at least for carrying the UCI, mapping of the DMRS of the PUCCH may be given based at least on the number of OFDM symbols of the PUCCH assumed.

For example, in a case that the starting OFDM symbol of the PUCCH configured by the second PUCCH format is the X-th OFDM symbol, the ending OFDM symbol of the PUCCH is the (X+L)-th OFDM symbol, and the floating CP is not applied to the time domain signal of the X-th OFDM symbol, it may be given based at least on an assumption that the number of OFDM symbols of the PUCCH is L+1 in determination of the number $N^{PUCCH,3}_{symb,UCI}$ of OFDM symbols used at least for carrying the UCI.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the floating CP is applied to a part of the time domain signal of the X-th OFDM symbol, it may be given based at least on an assumption that the number of OFDM symbols of the PUCCH is L in determination of the number $N^{PUCCH,3}_{symb,UCI}$ of OFDM symbols used at least for carrying the UCI.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the floating CP is applied to all of the time domain signals of the X-th OFDM symbol, it may be given based at least on an assumption that the number of OFDM symbols of the PUCCH is L in determination of the number $N^{PUCCH,3}_{symb,UCI}$ of OFDM symbols used at least for carrying the UCI.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the time domain signal of the X-th OFDM symbol is not transmitted with the floating CP not being applied thereto, it may be given based at least on an assumption that the number of OFDM symbols of the PUCCH is L in determination of the number $N^{PUCCH,3}_{symb,UCI}$ of OFDM symbols used at least for carrying the UCI.

For example, in a case that the starting OFDM symbol (X-th OFDM symbol) of the PUCCH configured by the second PUCCH format is given by the RRC parameter, a fact that the number of OFDM symbols of the PUCCH is L+1 is given by the RRC parameter, and the time domain signal of the X-th OFDM symbol is transmitted with the floating CP not being applied thereto, it may be given based at least on an assumption that the number of OFDM symbols of the PUCCH is L+1 in determination of the number $N^{PUCCH,3}_{symb,UCI}$ of OFDM symbols used at least for carrying the UCI.

For example, in a case that the starting OFDM symbol (X-th OFDM symbol) of the PUCCH configured by the second PUCCH format is given by the RRC parameter, and a fact that the number of OFDM symbols of the PUCCH is L is given by the RRC parameter, it may be given based at least on an assumption that the number of OFDM symbols of the PUCCH is L in determination of the number $N^{PUCCH,3}_{symb,UCI}$ of OFDM symbols used at least for carrying the UCI, regardless of whether or not the floating CP is applied to the time domain signal of the (X −1)-th OFDM symbol. Here, in a case that the floating CP is applied to the time domain signal of the (X−1)-th OFDM symbol, the actual starting OFDM symbol of the PUCCH may be the (X −1)-th OFDM symbol.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the floating CP is applied to a part of the time domain signal of the (X−1)-th OFDM symbol, it may be given based at least on an assumption that the number of OFDM symbols of the PUCCH is L in determination of the number $N^{PUCCH,3}_{symb,UCI}$ of OFDM symbols used at least for carrying the UCI. Here, the actual starting OFDM symbol of the PUCCH may be the (X−1)-th OFDM symbol.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the floating CP is applied to all of the time domain signals of the (X−1)-th OFDM symbol, it may be given based at least on an assumption that the number of OFDM symbols of the PUCCH is L in determination of the number $N^{PUCCH,3}_{symb,UCI}$ of OFDM symbols used at least for carrying the UCI. Here, the actual starting OFDM symbol of the PUCCH may be the (X−1)-th OFDM symbol.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the time domain signal of the (X−1)-th OFDM symbol is not transmitted with the floating CP not being applied thereto, it may be given based at least on an assumption that the number of OFDM symbols of the PUCCH is L in determination of the number $N^{PUCCH,3}_{symb,UCI}$ of OFDM symbols used at least for carrying the UCI.

For example, in a case that the starting OFDM symbol (X-th OFDM symbol) of the PUCCH configured by the second PUCCH format is given by the RRC parameter, a fact that the number of OFDM symbols of the PUCCH is L is given by the RRC parameter, and the time domain signal of the (X−1)-th OFDM symbol is transmitted with the floating CP not being applied thereto, it may be given based at least on an assumption that the number of OFDM symbols of the PUCCH is L+1 in determination of the number $N^{PUCCH,3}_{symb,UCI}$ of OFDM symbols used at least for carrying the UCI.

The CSI transmitted on the PUCCH may be divided into two parts (blocks, groups, units). Here, the two parts are also referred to as CSI part 1 and CSI part 2. Error correction coding may be applied to each of the two parts. A CRC sequence may be added to each of the two parts.

In a case that CSI part 1 and CSI part 2 are transmitted on the PUCCH, a first coding bit sequence and a second coding bit sequence may be generated. Here, the first coding bit sequence may be a sequence after coding of the UCI including CSI part 1. The second coding bit sequence may be a sequence after coding of the UCI including CSI part 2.

In a case that CSI part 1 and CSI part 2 are transmitted on the PUCCH, the terminal apparatus 1 may determine a part or all of a first set of UCI symbols, a second set of UCI symbols, and a third set of UCI symbols. The terminal apparatus 1 may multiplex the first coding bit sequence and the second coding bit sequence, based at least on the set of UCI symbols determined. The set of UCI symbols is a general term for the first set of UCI symbols, the second set of UCI symbols, and the third set of UCI symbols.

FIG. 16 is a diagram illustrating an example related to a determination method of the set of UCI symbols according to an aspect of the present embodiment. In FIG. 16, PUCCH duration indicates the number of OFDM symbols of the PUCCH. PUCCH DMRS symbol indices indicate indices of the OFDM symbols to which the DMRS of the PUCCH is mapped. $N^{set}_{UCI}$ indicates the number of sets of UCI symbols. A first UCI symbol index set (1$^{st}$ UCI symbol indices set) $S^{(1)}_{UCI}$ indicates a set of indices of the OFDM symbols included in the first set of UCI symbols. A second UCI symbol index set (2$^{nd}$ UCI symbol indices set) $S^{(2)}_{UCI}$ indicates a set of indices of the OFDM symbols included in the second set of UCI symbols. A third UCI symbol index set (3$^{rd}$ UCI symbol indices set) $S^{(3)}_{UCI}$ indicates a set of indices of the OFDM symbols included in the third set of UCI symbols.

For example, in a case that the starting OFDM symbol of the PUCCH is the X-th OFDM symbol, the ending OFDM symbol of the PUCCH is the (X+L)-th OFDM symbol, and the floating CP is applied to the time domain signal of the X-th OFDM symbol, the set of UCI symbols used for multiplexing of the first coding bit sequence and the second coding bit sequence may be given based at least on an assumption that the PUCCH duration is L.

For example, in a case that the starting OFDM symbol of the PUCCH is the X-th OFDM symbol, the ending OFDM symbol of the PUCCH is the (X+L)-th OFDM symbol, and the floating CP is not applied to the time domain signal of the X-th OFDM symbol, the set of UCI symbols used for multiplexing of the first coding bit sequence and the second coding bit sequence may be given based at least on an assumption that the PUCCH duration is L+1.

For example, in a case that the starting OFDM symbol (X-th OFDM symbol) of the PUCCH is given by the RRC parameter, a fact that the number of OFDM symbols of the PUCCH is L+1 is given by the RRC parameter, and the floating CP is applied to a part of the time domain signal of the X-th OFDM symbol, the set of UCI symbols used for multiplexing of the first coding bit sequence and the second coding bit sequence may be given based at least on an assumption that the PUCCH duration is L.

For example, in a case that the starting OFDM symbol (X-th OFDM symbol) of the PUCCH is given by the RRC parameter, a fact that the number of OFDM symbols of the PUCCH is L+1 is given by the RRC parameter, and the floating CP is applied to all of the time domain signals of the X-th OFDM symbol, the set of UCI symbols used for multiplexing of the first coding bit sequence and the second coding bit sequence may be given based at least on an assumption that the PUCCH duration is L.

For example, in a case that the starting OFDM symbol (X-th OFDM symbol) of the PUCCH is given by the RRC parameter, a fact that the number of OFDM symbols of the PUCCH is L+1 is given by the RRC parameter, and the time domain signal of the X-th OFDM symbol is not transmitted with the floating CP not being applied thereto, the set of UCI symbols used for multiplexing of the first coding bit sequence and the second coding bit sequence may be given based at least on an assumption that the PUCCH duration is L.

For example, in a case that the starting OFDM symbol (X-th OFDM symbol) of the PUCCH is given by the RRC parameter, a fact that the number of OFDM symbols of the PUCCH is L+1 is given by the RRC parameter, and the time domain signal of the X-th OFDM symbol is transmitted with the floating CP not being applied thereto, the set of UCI symbols used for multiplexing of the first coding bit sequence and the second coding bit sequence may be given based at least on an assumption that the PUCCH duration is L+1.

For example, in a case that the starting OFDM symbol (X-th OFDM symbol) of the PUCCH is given by the RRC parameter, and a fact that the number of OFDM symbols of the PUCCH is L is given by the RRC parameter, the set of UCI symbols used for multiplexing of the first coding bit sequence and the second coding bit sequence may be given based at least on an assumption that the PUCCH duration is L, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUCCH may be the (X−1)-th OFDM symbol.

For example, in a case that the starting OFDM symbol (X-th OFDM symbol) of the PUCCH is given by the RRC parameter, a fact that the number of OFDM symbols of the PUCCH is L is given by the RRC parameter, and the floating CP is applied to a part of the time domain signal of the (X−1)-th OFDM symbol, the set of UCI symbols used for multiplexing of the first coding bit sequence and the second coding bit sequence may be given based at least on an assumption that the PUCCH duration is L. Here, the actual starting OFDM symbol of the PUCCH may be the (X−1)-th OFDM symbol.

For example, in a case that the starting OFDM symbol (X-th OFDM symbol) of the PUCCH is given by the RRC parameter, a fact that the number of OFDM symbols of the PUCCH is L is given by the RRC parameter, and the floating CP is applied to all of the time domain signals of the (X−1)-th OFDM symbol, the set of UCI symbols used for multiplexing of the first coding bit sequence and the second coding bit sequence may be given based at least on an assumption that the PUCCH duration is L. Here, the actual starting OFDM symbol of the PUCCH may be the (X−1)-th OFDM symbol.

For example, in a case that the starting OFDM symbol (X-th OFDM symbol) of the PUCCH is given by the RRC parameter, a fact that the number of OFDM symbols of the PUCCH is L is given by the RRC parameter, and the time domain signal of the (X−1)-th OFDM symbol is not transmitted with the floating CP not being applied thereto, the set of UCI symbols used for multiplexing of the first coding bit sequence and the second coding bit sequence may be given based at least on an assumption that the PUCCH duration is L.

For example, in a case that the starting OFDM symbol (X-th OFDM symbol) of the PUCCH is given by the RRC parameter, a fact that the number of OFDM symbols of the PUCCH is L is given by the RRC parameter, and the time domain signal of the (X−1)-th OFDM symbol is transmitted with the floating CP not being applied thereto, the set of UCI symbols used for multiplexing of the first coding bit sequence and the second coding bit sequence may be given based at least on an assumption that the PUCCH duration is L+1.

In the following, description will be given by taking an example of a case that the uplink physical channel 1303 is configured as the PUSCH.

In mapping of the DMRS of the PUSCH, a reference point Li is used. The reference point Li indicates the index of the OFDM symbol that satisfies OFDM symbol index 1=0. For example, for PUSCH mapping type A, the reference point $1_{ref}$ may be the index of the first OFDM symbol of a slot. For PUSCH mapping type B, the reference point $1_{ref}$ may be the index of the first OFDM symbol of a scheduled PUSCH.

For example, in a case that the starting OFDM symbol of the PUSCH is the X-th OFDM symbol, the ending OFDM symbol of the PUSCH is the (X+L)-th OFDM symbol, and the floating CP is applied to the time domain signal of the X-th OFDM symbol, the DMRS of the PUSCH may be mapped based at least on an assumption that the reference point $1_{ref}$ is the index of the (X+1)-th OFDM symbol.

For example, in a case that the starting OFDM symbol of the PUSCH is the X-th OFDM symbol, the ending OFDM symbol of the PUSCH is the (X+L)-th OFDM symbol, and the floating CP is not applied to the time domain signal of the X-th OFDM symbol, the DMRS of the PUSCH may be mapped based at least on an assumption that the reference point $1_{ref}$ is the index of the X-th OFDM symbol.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the floating CP is applied to a part of the time domain signal of the X-th OFDM symbol, the DMRS of the PUSCH may be mapped based at least on an assumption that the reference point $1_{ref}$ is the index of the (X+1)-th OFDM symbol.

For example, in a case that the starting OFDM symbol (X-th OFDM symbol) of the PUSCH is given by the uplink DCI format, a fact that the number of OFDM symbols of the PUCCH is L+1 is given by the uplink DCI format, and the floating CP is applied to all of the time domain signals of the X-th OFDM symbol, the DMRS of the PUSCH may be mapped based at least on an assumption that the reference point $1_{ref}$ is the index of the (X+1)-th OFDM symbol.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the time domain signal of the X-th OFDM symbol is not transmitted with the floating CP not being applied thereto, the DMRS of the PUSCH may be mapped based at least on an assumption that the reference point $1_{ref}$ is the index of the (X+1)-th OFDM symbol.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the time domain signal of the X-th OFDM symbol is transmitted with the floating CP not being applied thereto, the DMRS of the PUSCH may be mapped based at least on an assumption that the reference point $1_{ref}$ is the index of the X-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, the DMRS of the PUSCH may be mapped based at least on an assumption that the reference point Li is the index of the X-th OFDM symbol, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUSCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the floating CP is applied to a part of the time domain signal of the (X−1)-th OFDM symbol, the DMRS of the PUSCH may be mapped based at least on an assumption that the reference point $1_{ref}$ is the index of the X-th OFDM symbol. Here, the actual starting OFDM symbol of the PUCCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the floating CP is applied to all of the time domain signals of the (X−1)-th OFDM symbol, the DMRS of the PUSCH may be mapped based at least on an assumption that the reference point Li is the index of the X-th OFDM symbol. Here, the actual starting OFDM symbol of the PUCCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the time domain signal of the (X−1)-th OFDM symbol is not transmitted with the floating CP not being applied thereto, the DMRS of the PUCCH may be mapped based at least on an assumption that the reference point $1_{ref}$ is the index of the X-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the time domain signal of the (X−1)-th OFDM symbol is transmitted with the floating CP not being applied thereto, the DMRS of the PUSCH may be mapped based at least on an assumption that the reference point $1_{ref}$ is the index of the (X−1)-th OFDM symbol.

For example, in a case that the floating CP is applied to PUSCH mapping type A, and a fact that the starting OFDM symbol of the PUSCH is the X-th OFDM symbol is given by the uplink DCI format, the floating CP may be applied to a part or all of the OFDM symbol of index X. In a case that the floating CP is applied to PUSCH mapping type B, and a fact that the starting OFDM symbol of the PUSCH is the X-th OFDM symbol is given by the uplink DCI format, the floating CP may be applied to a part or all of the OFDM symbols of index X−1.

The DMRS of the PUSCH may be mapped to the OFDM symbols included in a set $1_x$ of OFDM symbols. For example, in a case that a set $1_{set}$ of OFDM symbols at least includes OFDM symbol index $1_x$, the DMRS of the PUSCH may be mapped at least to the OFDM symbol of index $1_{ref}+1_x$.

The set $1_{set}$ of OFDM symbols may be given based at least on the number of OFDM symbols of the PUSCH.

For example, in a case that the starting OFDM symbol of the PUSCH is the X-th OFDM symbol, the ending OFDM symbol of the PUSCH is the (X+L)-th OFDM symbol, and the floating CP is applied to the time domain signal of the X-th OFDM symbol, the set $1_x$ of OFDM symbols to which the DMRS of the PUSCH is mapped may be given based at least on an assumption that the number of OFDM symbols of the PUSCH is L.

For example, in a case that the starting OFDM symbol of the PUSCH is the X-th OFDM symbol, the ending OFDM symbol of the PUSCH is the (X+L)-th OFDM symbol, and the floating CP is not applied to the time domain signal of the X-th OFDM symbol, the set $1_x$ of OFDM symbols to which the DMRS of the PUSCH is mapped may be given based at least on an assumption that the number of OFDM symbols of the PUSCH is L+1.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the floating CP is applied to a part of the time domain signal of the X-th OFDM symbol, the set $1_x$ of OFDM symbols to which the DMRS of the PUSCH is mapped may be given based at least on an assumption that the number of OFDM symbols of the PUSCH is L.

For example, in a case that the starting OFDM symbol (X-th OFDM symbol) of the PUSCH is given by the uplink DCI format, a fact that the number of OFDM symbols of the PUCCH is L+1 is given by the uplink DCI format, and the floating CP is applied to all of the time domain signals of the X-th OFDM symbol, the set 1: of OFDM symbols to which the DMRS of the PUSCH is mapped may be given based at least on an assumption that the number of OFDM symbols of the PUSCH is L.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the time domain signal of the X-th OFDM symbol is not transmitted with the floating CP not being applied thereto, the set $1_x$ of OFDM symbols to which the DMRS of the PUSCH is mapped may be given based at least on an assumption that the number of OFDM symbols of the PUSCH is L.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the time domain signal of the X-th OFDM symbol is transmitted with the floating CP not being applied thereto, the set $1_x$ of OFDM symbols to which the DMRS of the PUSCH is mapped may be given based at least on an assumption that the number of OFDM symbols of the PUSCH is L+1.

For example, in a case that the starting OFDM symbol (X-th OFDM symbol) of the PUSCH is given by the uplink DCI format, and a fact that the number of OFDM symbols of the PUSCH is L is given by the uplink DCI format, the set $1_x$ of OFDM symbols to which the DMRS of the PUSCH is mapped may be given based at least on an assumption that the number of OFDM symbols of the PUSCH is L, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUSCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the floating CP is applied to a part of the time domain signal of the (X−1)-th OFDM symbol, the set $1_x$ of OFDM symbols to which the DMRS of the PUSCH is mapped may be given based at least on an assumption that the number of OFDM symbols of the PUSCH is L. Here, the actual starting OFDM symbol of the PUCCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the floating CP is applied to all of the time domain signals of the (X−1)-th OFDM symbol, the set $1_x$ of OFDM symbols to which the DMRS of the PUSCH is mapped may be given based at least on an assumption that the number of OFDM symbols of the PUSCH is L. Here, the actual starting OFDM symbol of the PUCCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the time domain signal of the (X−1)-th OFDM symbol is not transmitted with the floating CP not being applied thereto, the set $\mathbf{1}_x$ of OFDM symbols to which the DMRS of the PUSCH is mapped may be given based at least on an assumption that the number of OFDM symbols of the PUSCH is L.

For example, in a case that the starting OFDM symbol (X-th OFDM symbol) of the PUSCH is given by the uplink DCI format, a fact that the number of OFDM symbols of the PUSCH is L is given by the uplink DCI format, and the time domain signal of the (X−1)-th OFDM symbol is transmitted with the floating CP not being applied thereto, the set $\mathbf{1}_x$ of OFDM symbols to which the DMRS of the PUSCH is mapped may be given based at least on an assumption that the number of OFDM symbols of the PUSCH is L+1.

The TBS of the PUSCH may be given based at least on a parameter $N'_{RE}$. The parameter $N'_{RE}$ is a value associated with the number of resource elements used for transmission of the transport block per PRB. The parameter $N'_{RE}$ may be given by $N^{RB}_{sc} \cdot N^{sh}_{symb} - N^{PRB}_{DMRS} - N^{PRB}_{oh}$. Here, $N^{sh}_{symb}$ is the number of OFDM symbols allocated for the PUSCH in a certain slot. $N^{PRB}_{DMRS}$ may indicate a value associated with the number of resource elements used for the DMRS per PRB·$N^{PRB}_{oh}$ is an integer value indicated by the RRC parameter.

For example, in a case that the starting OFDM symbol of the PUSCH is the X-th OFDM symbol, the ending OFDM symbol of the PUSCH is the (X+L)-th OFDM symbol, and the floating CP is applied to the time domain signal of the X-th OFDM symbol, the TBS of the PUSCH may be given based at least on an assumption that the number $N^{sh}_{symb}$ of OFDM symbols allocated for the PUSCH is L.

In determination of the TBS of the PUSCH, mapping of the DMRS of the PUCCH may be given based at least on the number of OFDM symbols of the PUCCH assumed. In determination of the TBS of the PUSCH, $N^{PRB}_{DMRS}$ may indicate a value associated with the number of resource elements used for the DMRS per PRB, which is given based at least on the number of OFDM symbols of the PUCCH assumed.

For example, in a case that the starting OFDM symbol of the PUSCH is the X-th OFDM symbol, the ending OFDM symbol of the PUSCH is the (X+L)-th OFDM symbol, and the floating CP is not applied to the time domain signal of the X-th OFDM symbol, the TBS of the PUSCH may be given based at least on an assumption that the number $N^{sh}_{symb}$ of OFDM symbols allocated for the PUSCH is L+1.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the floating CP is applied to a part of the time domain signal of the X-th OFDM symbol, the TBS of the PUSCH may be given based at least on an assumption that the number $N^{sh}_{symb}$ of OFDM symbols allocated for the PUSCH is L.

For example, in a case that the starting OFDM symbol (X-th OFDM symbol) of the PUSCH is given by the uplink DCI format, a fact that the number of OFDM symbols of the PUCCH is L+1 is given by the uplink DCI format, and the floating CP is applied to all of the time domain signals of the X-th OFDM symbol, the TBS of the PUSCH may be given based at least on an assumption that the number $N^{sh}_{symb}$ of OFDM symbols allocated for the PUSCH is L.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the time domain signal of the X-th OFDM symbol is not transmitted with the floating CP not being applied thereto, the TBS of the PUSCH may be given based at least on an assumption that the number $N^{sh}_{symb}$ of OFDM symbols allocated for the PUSCH is L.

For example, in a case that the starting OFDM symbol (X-th OFDM symbol) of the PUSCH is given by the uplink DCI format, a fact that the number of OFDM symbols of the PUSCH is L+1 is given by the uplink DCI format, and the time domain signal of the X-th OFDM symbol is transmitted with the floating CP not being applied thereto, the TBS of the PUSCH may be given based at least on an assumption that the number $N^{sh}_{symb}$ of OFDM symbols allocated for the PUSCH is L+1.

For example, in a case that the starting OFDM symbol (X-th OFDM symbol) of the PUSCH is given by the uplink DCI format, and a fact that the number of OFDM symbols of the PUSCH is L is given by the uplink DCI format, the TBS of the PUSCH may be given based at least on an assumption that the number $N^{sh}_{symb}$ of OFDM symbols allocated for the PUSCH is L, regardless of whether or not the floating CP is applied to the time domain signal of the (X−1)-th OFDM symbol. Here, in a case that the floating CP is applied to the time domain signal of the (X−1)-th OFDM symbol, the actual starting OFDM symbol of the PUSCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the floating CP is applied to a part of the time domain signal of the (X−1)-th OFDM symbol, the TBS of the PUSCH may be given based at least on an assumption that the number $N^{sh}_{symb}$ of OFDM symbols allocated for the PUSCH is L. Here, the actual starting OFDM symbol of the PUCCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the floating CP is applied to all of the time domain signals of the (X−1)-th OFDM symbol, the TBS of the PUSCH may be given based at least on an assumption that the number $N^{sh}_{symb}$ of OFDM symbols allocated for the PUSCH is L. Here, the actual starting OFDM symbol of the PUCCH may be the (X−1)-th OFDM symbol.

For example, in a case that the starting OFDM symbol (X-th OFDM symbol) of the PUSCH is given by the uplink DCI format, a fact that the number of OFDM symbols of the PUSCH is L is given by the uplink DCI format, and the time domain signal of the (X−1)-th OFDM symbol is not transmitted with the floating CP not being applied thereto, the TBS of the PUSCH may be given based at least on an assumption that the number $N^{sh}_{symb}$ of OFDM symbols allocated for the PUSCH is L+1.

For example, in a case that the starting OFDM symbol (X-th OFDM symbol) of the PUSCH is given by the uplink DCI format, a fact that the number of OFDM symbols of the PUSCH is L is given by the uplink DCI format, and the time domain signal of the (X−1)-th OFDM symbol is transmitted with the floating CP not being applied thereto, the TBS of the PUSCH may be given based at least on an assumption that the number $N^{sh}_{symb}$ of OFDM symbols allocated for the PUSCH is L+1.

Various aspects of apparatuses according to an aspect of the present embodiment will be described below.

(1) In order to accomplish the object described above, an aspect of the present invention is contrived to provide the following means. In other words, a first aspect of the present invention is a terminal apparatus including: a channel generation unit configured to generate a time domain signal of a PUCCH mapped from an X-th OFDM symbol to an (X+L)-th OFDM symbol in a slot; and a transmitter configured to transmit the PUCCH, wherein in a case that the time domain signal of the X-th OFDM symbol is generated based at least on contents of resource elements included in an (X+1)-th OFDM symbol, a set of OFDM symbols to which a DMRS of the PUCCH is mapped is given based at least on an assumption that the number of OFDM symbols of the PUCCH is L.

(2) A second aspect of the present invention is a terminal apparatus including: a channel generation unit configured to generate a time domain signal of a PUCCH mapped from an X-th OFDM symbol to an (X+L)-th OFDM symbol in a slot; and a transmitter configured to transmit CSI part 1 and CSI part 2 on the PUCCH, wherein in a case that the time domain signal of the X-th OFDM symbol is generated based at least on contents of resource elements included in an (X+1)-th OFDM symbol, a set of UCI symbols used in multiplexing of the CSI part 1 and the CSI part 2 is given based at least on an assumption that the number of OFDM symbols of the PUCCH is L.

(3) A third aspect of the present invention is a base station apparatus including: a receiver configured to receive a PUCCH mapped from an X-th OFDM symbol to an (X+L)-th OFDM symbol in a slot; and a channel demodulation unit configured to demodulate a time domain signal of the PUCCH, wherein in a case that the time domain signal of the X-th OFDM symbol is generated based at least on contents of resource elements included in an (X+1)-th OFDM symbol, a set of OFDM symbols to which a DMRS of the PUCCH is mapped is given based at least on an assumption that the number of OFDM symbols of the PUCCH is L.

(4) The fourth aspect of the present invention is a base station apparatus including: a receiver configured to receive a PUCCH mapped from an X-th OFDM symbol to an (X+L)-th OFDM symbol in a slot; and a demodulation unit configured to acquire CST part 1 and CSI part 2 from the PUCCH, wherein in a case that the time domain signal of the X-th OFDM symbol is generated based at least on contents of resource elements included in an (X+1)-th OFDM symbol, a set of UCI symbols used in multiplexing of the CSI part 1 and the CSI part 2 is given based at least on an assumption that the number of OFDM symbols of the PUCCH is L.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11,31 Antenna unit
12, 32 RF unit
13, 33 Baseband unit
14, 34 Higher layer processing unit
15, 35 Medium access control layer processing unit
16, 36 Radio resource control layer processing unit
91, 92, 93, 94 Search space set
300 Component carrier
301 Primary cell
302, 303 Secondary cell
1303, 1303a, 1303b Uplink physical channel
1301 Physical signal
1302 Gap related to switch between downlink and uplink
3000 Point
3001, 3002 Resource grid
3003, 3004 BWP
3011, 3012, 3013, 3014 Offset
3100, 3200 Common resource block set

The invention claimed is:

1. A terminal apparatus comprising:
reception circuitry configured to receive a physical downlink control channel (PDCCH) in which a downlink control information (DCI) format scheduling a physical uplink shared channel (PUSCH) is mapped; and
transmission circuitry configured to transmit the PUSCH, wherein
a first time-signal for the PUSCH and a second time-signal for the PUSCH are generated based on same contents of same resource elements in an orthogonal frequency-division multiplexing (OFDM) symbol having an index X,
the first time-signal for the PUSCH is in the OFDM symbol,
the second time-signal is transmitted preceding the OFDM symbol,
the index X being a starting OFDM symbol of the PUSCH is indicated by the DCI format,
a value L being a number of OFDM symbols for the PUSCH is indicated by the DCI format, and
a size of a transport block of the PUSCH is determined by assuming that a number $N^{sh}_{symb}$ of OFDM symbols is the value L.

2. A base station apparatus comprising:
transmission circuitry configured to transmit a physical downlink control channel (PDCCH) in which a downlink control information (DCI) format scheduling a physical uplink shared channel (PUSCH) is mapped; and
reception circuitry configured to receive the PUSCH, wherein
a first time-signal for the PUSCH and a second time-signal for the PUSCH are generated based on same contents of same resource elements in an orthogonal frequency-division multiplexing (OFDM) symbol having an index X,
the first time-signal for the PUSCH is in the OFDM symbol,
the second time-signal is transmitted preceding the OFDM symbol,
the index X being a starting OFDM symbol of the PUSCH is indicated by the DCI format,
a value L being a number of OFDM symbols for the PUSCH is indicated by the DCI format, and
a size of a transport block of the PUSCH is determined by assuming that a number $N^{sh}_{symb}$ of OFDM symbols is the value L.

3. A communication method for a terminal apparatus, the communication method comprising:
receiving a physical downlink control channel (PDCCH) in which a downlink control information (DCI) format scheduling a physical uplink shared channel (PUSCH) is mapped; and
transmitting the PUSCH, wherein
a first time-signal for the PUSCH and a second time-signal for the PUSCH are generated based on same contents of same resource elements in an orthogonal frequency-division multiplexing (OFDM) symbol having an index X,
the first time-signal for the PUSCH is in the OFDM symbol,
the second time-signal is transmitted preceding the OFDM symbol,
the index X being a starting OFDM symbol of the PUSCH is indicated by the DCI format,
a value L being a number of OFDM symbols for the PUSCH is indicated by the DCI format, and
a size of a transport block of the PUSCH is determined by assuming that a number $N^{sh}_{symb}$ of OFDM symbols is the value L.

* * * * *